US012598417B2

(12) United States Patent
Peace

(10) Patent No.: US 12,598,417 B2
(45) Date of Patent: Apr. 7, 2026

(54) WAVEGUIDES FOR SIDE-FIRING AUDIO TRANSDUCERS

(71) Applicant: Sonos, Inc., Santa Barbara, CA (US)

(72) Inventor: Paul Peace, Boston, MA (US)

(73) Assignee: Sonos, Inc., Goleta, CA (US)

( * ) Notice: Subject to any disclaimer, the term of this patent is extended or adjusted under 35 U.S.C. 154(b) by 205 days.

(21) Appl. No.: 18/557,363

(22) PCT Filed: May 2, 2022

(86) PCT No.: PCT/US2022/072035
§ 371 (c)(1),
(2) Date: Oct. 26, 2023

(87) PCT Pub. No.: WO2022/236240
PCT Pub. Date: Nov. 10, 2022

(65) Prior Publication Data

US 2024/0223945 A1 Jul. 4, 2024

Related U.S. Application Data

(60) Provisional application No. 63/201,593, filed on May 5, 2021, provisional application No. 63/201,594, filed on May 5, 2021.

(51) Int. Cl.
*H04R 1/34* (2006.01)
*H04R 1/02* (2006.01)

(52) U.S. Cl.
CPC ............. *H04R 1/345* (2013.01); *H04R 1/025* (2013.01)

(58) Field of Classification Search
CPC ................................ H04R 1/345; H04R 1/025
USPC .......................................................... 381/338
See application file for complete search history.

(56) References Cited

U.S. PATENT DOCUMENTS

| | | | | |
|---|---|---|---|---|
| 5,440,644 | A | 8/1995 | Farinelli et al. | |
| 5,761,320 | A | 6/1998 | Farinelli et al. | |
| 5,900,593 | A * | 5/1999 | Adamson ............... | H04R 1/345 181/152 |
| 5,923,902 | A | 7/1999 | Inagaki | |

(Continued)

FOREIGN PATENT DOCUMENTS

| | | | |
|---|---|---|---|
| DE | 202014009095 U1 | 12/2014 | |
| EP | 1389853 A1 | 2/2004 | |

(Continued)

OTHER PUBLICATIONS

AudioTron Quick Start Guide, Version 1.0, Mar. 2001, 24 pages.

(Continued)

*Primary Examiner* — Sean H Nguyen
(74) *Attorney, Agent, or Firm* — Fortem IP LLP

(57) ABSTRACT

A playback device includes an enclosure having a front face substantially normal to a first direction, a side-firing audio transducer facing a second direction that is angled with respect to the first direction, and a waveguide in fluid communication with the side-firing transducer. The waveguide includes a first chamber extending along a first axis and a second chamber extending along a second axis. The first and second central axes diverge along the second direction away from the side-firing transducer. The waveguide can be adjustable to vary the relative dimensions and/or orientations of the first and second chambers.

19 Claims, 18 Drawing Sheets

(56) References Cited

U.S. PATENT DOCUMENTS

| | | | | |
|---|---|---|---|---|
| 6,028,947 | A * | 2/2000 | Faraone | H04R 1/30 381/337 |
| 6,032,202 | A | 2/2000 | Lea et al. | |
| 6,256,554 | B1 | 7/2001 | DiLorenzo | |
| 6,404,811 | B1 | 6/2002 | Cvetko et al. | |
| 6,469,633 | B1 | 10/2002 | Wachter | |
| 6,522,886 | B1 | 2/2003 | Youngs et al. | |
| 6,611,537 | B1 | 8/2003 | Edens et al. | |
| 6,631,410 | B1 | 10/2003 | Kowalski et al. | |
| 6,757,517 | B2 | 6/2004 | Chang | |
| 6,778,869 | B2 | 8/2004 | Champion | |
| 7,092,541 | B1 | 8/2006 | Eberbach | |
| 7,130,608 | B2 | 10/2006 | Hollstrom et al. | |
| 7,130,616 | B2 | 10/2006 | Janik | |
| 7,143,939 | B2 | 12/2006 | Henzerling | |
| 7,236,773 | B2 | 6/2007 | Thomas | |
| 7,295,548 | B2 | 11/2007 | Blank et al. | |
| 7,391,791 | B2 | 6/2008 | Balassanian et al. | |
| 7,483,538 | B2 | 1/2009 | McCarty et al. | |
| 7,571,014 | B1 | 8/2009 | Lambourne et al. | |
| 7,590,257 | B1 | 9/2009 | Blanchard et al. | |
| 7,624,839 | B1 * | 12/2009 | Graber | H04R 1/2896 381/349 |
| 7,630,501 | B2 | 12/2009 | Blank et al. | |
| 7,643,894 | B2 | 1/2010 | Braithwaite et al. | |
| 7,657,910 | B1 | 2/2010 | McAulay et al. | |
| 7,853,341 | B2 | 12/2010 | McCarty et al. | |
| 7,987,294 | B2 | 7/2011 | Bryce et al. | |
| 8,014,423 | B2 | 9/2011 | Thaler et al. | |
| 8,045,952 | B2 | 10/2011 | Qureshey et al. | |
| 8,103,009 | B2 | 1/2012 | McCarty et al. | |
| 8,234,395 | B2 | 7/2012 | Millington | |
| 8,483,853 | B1 | 7/2013 | Lambourne | |
| 8,942,252 | B2 | 1/2015 | Balassanian et al. | |
| 2001/0042107 | A1 | 11/2001 | Palm | |
| 2002/0022453 | A1 | 2/2002 | Balog et al. | |
| 2002/0026442 | A1 | 2/2002 | Lipscomb et al. | |
| 2002/0124097 | A1 | 9/2002 | Isely et al. | |
| 2003/0157951 | A1 | 8/2003 | Hasty, Jr. | |
| 2004/0024478 | A1 | 2/2004 | Hans et al. | |
| 2006/0062402 | A1 | 3/2006 | Heil | |
| 2007/0142944 | A1 | 6/2007 | Goldberg et al. | |
| 2009/0277713 | A1 | 11/2009 | Thopson | |
| 2011/0019844 | A1 | 1/2011 | Chang | |
| 2016/0119711 | A1 * | 4/2016 | DeLay | G10K 13/00 181/196 |

FOREIGN PATENT DOCUMENTS

| | | | |
|---|---|---|---|
| WO | 200153994 | | 7/2001 |
| WO | 2003093950 | A2 | 11/2003 |
| WO | 2022159941 | A1 | 7/2022 |

OTHER PUBLICATIONS

AudioTron Reference Manual, Version 3.0, May 2002, 70 pages.

AudioTron Setup Guide, Version 3.0, May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

International Bureau, International Search Report and Written Opinion mailed on Dec. 23, 2022, issued in connection with International Application No. PCT/US2022/072035, filed on May 2, 2022, 29 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

*Sonos, Inc.* v. *DM Holdings* (No. 14-1330-RGA), DI 219, Claim Construction Opinion (Jan. 12, 2017) (24 pages).

United States Patent and Trademark Office, U.S. Appl. No. 60/490,768, filed Jul. 28, 2003, entitled "Method for synchronizing audio playback between multiple networked devices," 13 pages.

United States Patent and Trademark Office, U.S. Appl. No. 60/825,407, filed Sep. 12, 2006, entitled "Controlling and manipulating groupings in a multi-zone music or media system," 82 pages.

UPnP; "Universal Plug and Play Device Architecture," Jun. 8, 2000; version 1.0; Microsoft Corporation; pp. 1-54.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

European Patent Office, European EPC Article 94.3 mailed on Dec. 16, 2025, issued in connection with European Application No. 22725680.7, 8 pages.

* cited by examiner

WAVEGUIDES FOR SIDE-FIRING AUDIO TRANSDUCERS

CROSS-REFERENCE TO RELATED APPLICATIONS

The present application is a 371 national phase of International Patent Application No. PCT/US2022/072035, filed May 2, 2022, which claims the benefit of priority to U.S. Patent Application No. 63/201,593, filed May 5, 2021, and to U.S. Patent Application No. 63/201,594, filed May 5, 2021, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, examples, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

Figure 1A:
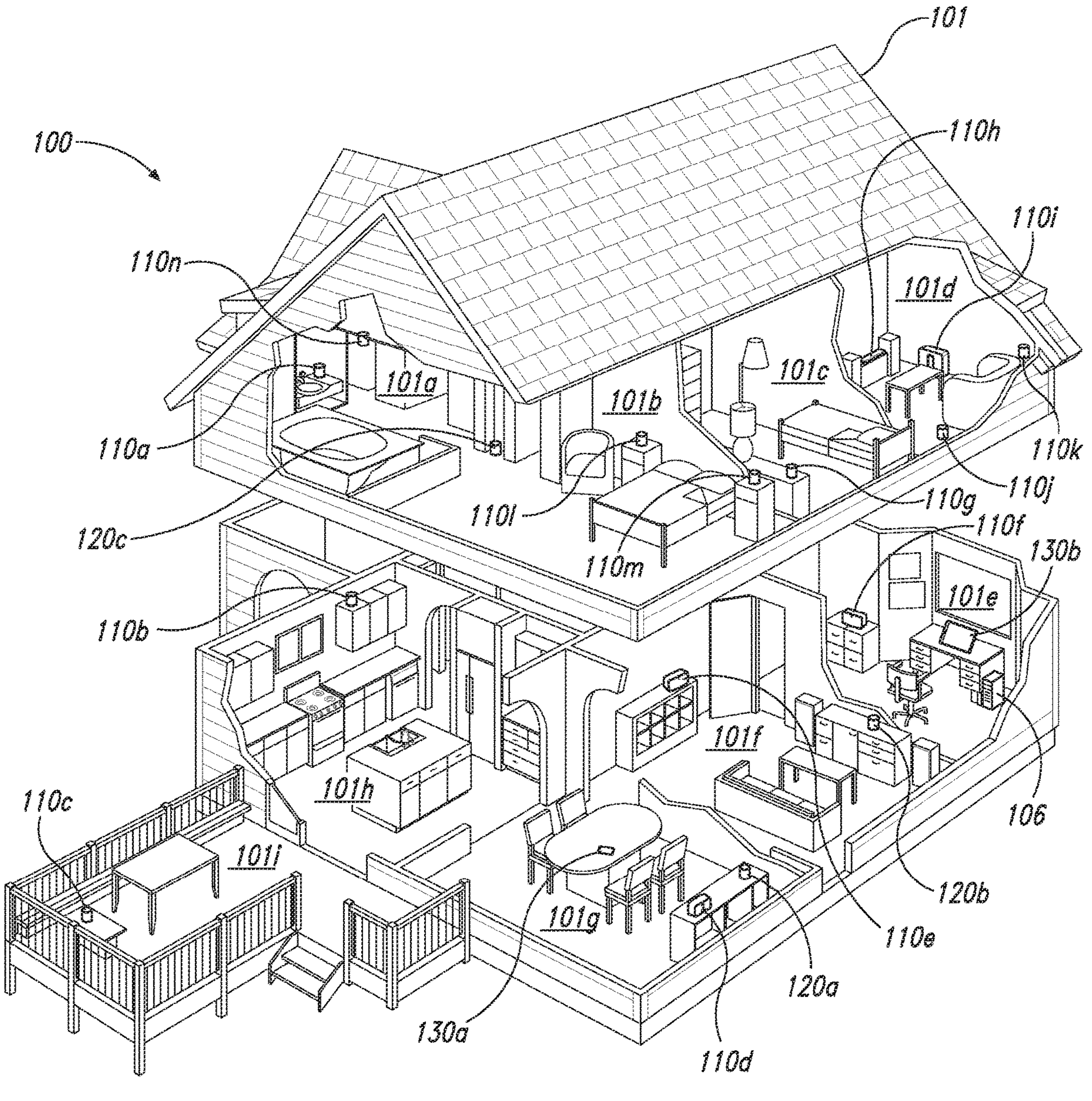
FIG. 1A is a partial cutaway view of an environment having a media playback system configured in accordance with examples of the disclosed technology.

The drawings are for the purpose of illustrating example examples, but those of ordinary skill in the art will understand that the technology disclosed herein is not limited to the arrangements and/or instrumentality shown in the drawings.

DETAILED DESCRIPTION

I. Overview

Conventional home theatre audio formats include a plurality of channels configured to represent different lateral positions with respect to a listener (e.g., center, left, and right). Certain audio playback devices, such as soundbars, may include a plurality of transducers in different orientations that are configured to direct audio output towards a user in a manner that allows a user to localize the various channels as originating from different locations. For example, center channel audio content can be directed forward towards a user via one or more forwardly oriented transducers (herein referred to as a "forward-firing transducer"). As such, the user perceives this content as originating from the soundbar location. Left and right channel audio content may each be played back at least in part via respective transducers that are oriented at a lateral angle with respect to the forward-firing transducer (herein referred to as "side-firing transducers"). Audio output via a side-firing transducer may be directed sideways such that it reflects off a wall and is redirected towards the user (e.g., with a left side-firing transducer directing left channel audio content towards a wall to the user's left, and a right side-firing transducer directing right channel audio content towards a wall to the user's right). Because of this reflection, the user perceives this side-firing audio content as originating from the reflection point on the wall. With this approach, the user experiences increased spaciousness and immersiveness in playback of home theatre audio content. In some cases, waveguides are used in conjunction with each side-firing transducer to direct the audio output along the desired axis.

Often, such side-firing transducers are placed at or near the left and right ends of a soundbar. In use, however, a soundbar may be placed in a cabinet or another location where side-firing transducers may be obstructed. This may be particularly true in the case of soundbars having a relatively compact form. In such a configuration, the side-firing audio content may be dampened or otherwise distorted, and the unintended reflections off the cabinet or other structure adjacent the soundbar may cause the user to localize audio content at undesirable positions. To address this and other shortcomings, it can be advantageous to position side-firing transducers nearer towards the center of the enclosure as compared to conventional designs. By placing the side-firing transducers at positions that are inwardly offset from the left and right ends of the enclosure, the risk of unintended obstruction or distorting reflections off an adjacent cabinet or other such structures may be reduced.

Although reflecting sound off a wall provides increased spaciousness for the user, this approach may nonetheless cause the user to localize the reflected audio at an undesirable location. For example, left front channel audio is generally intended to be played back to the user from a location that is offset from the forward axis of the soundbar by a 30-degree angle. However, in some configurations, the geometry of the room results in a reflected audio signal that is localized by a user at a position that is offset from the forward axis by further than 30 degrees, for example 45 degrees or more.

Examples of the present technology address this and other shortcomings by providing a waveguide in front of each side-firing transducer that is configured to direct acoustic energy along two distinct directions: a first side-propagating direction that is laterally angled with respect to the forward axis (e.g., at 50 degrees with respect to the forward axis) and a second forward-propagating direction that is nearer to (or parallel to) the forward axis of the soundbar. In this configuration, the audio output along the side-propagating direction reaches the user via wall reflection, and the audio output along the forward-propagating direction reaches the user without intervening reflection.

When substantially identical sounds reach a user from two different locations, the user will generally perceive the sounds as a single fused sound and as arriving from a location between those two locations. If one sound is louder than another, the apparent location of the perceived sound will be skewed toward the location associated with the louder sound. Additionally, due to the well-known precedence effect, if the two sounds do not reach the user simultaneously (differing by more than a threshold amount, e.g., about 40 ms), the apparent location of the perceived sound will be dominated by the location of the sound that reached the user's ears first. Examples of the present technology take advantage of these phenomena to achieve the desired localization of side-firing audio content.

In the case of side-propagating audio that reflects off a wall and forward-propagating audio that reaches a user without reflection, the forward-propagating audio will reach the user first, as the direct path length between the transducer and the user is shorter than the path length of the reflected signal. As such, given the same acoustic energy of the forward-propagating signal and the side-propagating signal, the user will localize the audio as originating from a location much nearer to the soundbar than to the reflection point. This is generally undesirable as the audio content routed to a side-firing transducer is intended to be perceived by the user as originating from a location offset from the soundbar. To achieve the desired psychoacoustic effect (e.g., the user localizing the side-firing audio content as originating from a location approximately 30 degrees off-axis from the forward axis of the soundbar), it is beneficial to control the relative amplitudes of acoustic energy directed along each of the two directions. In particular, by directing a greater proportion of the acoustic energy along the side-propagating direction than along the forward-propagating direction (e.g., by at least 5 dB or more), the user will localize the sound as originating from an area between the reflection point and the soundbar, notwithstanding the fact that the forward-propagating audio reaches the user first.

Examples of waveguides configured to achieve these results are described in greater detail below. Such a waveguide can include two cavities: a first cavity directing sound generally along the forward-propagating direction and a second, larger cavity directing sound along the side-propagating direction towards a reflective wall. This waveguide configuration can cause the side-propagating sound to reach a user (in a typical listening location in front of the soundbar) with a higher magnitude (e.g., 5 dB or more higher, 10 dB or more higher, etc.) than the forward-propagating sound. The resulting psychoacoustic effect of the side-directed sound reaching the listener with a higher magnitude than the forward-directed is that the user perceives the sound as emanating from the side rather than in front of the user, although at a position that is in between the reflection point and the soundbar.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular examples of the disclosed technology. Accordingly, other examples can have other details, dimensions, angles and features without departing from the spirit or scope of the disclosure. In addition, those of ordinary skill in the art will appreciate that further examples of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110*a-n*), one or more network microphone devices ("NMDs"), 120 (identified individually as NMDs

120*a-c*), and one or more control devices 130 (identified individually as control devices 130*a* and 130*b*).

As used herein the term "playback device" can generally refer to a network device configured to receive, process, and output data of a media playback system. For example, a playback device can be a network device that receives and processes audio content. In some examples, a playback device includes one or more transducers or speakers powered by one or more amplifiers. In other examples, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some examples, an NMD is a stand-alone device configured primarily for audio detection. In other examples, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain examples, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some examples, for instance, the media playback system 100 is configured to play back audio from a first playback device (e.g., the playback device 110*a*) in synchrony with a second playback device (e.g., the playback device 110*b*). Interactions between the playback devices 110, NMDs 120, and/or control devices 130 of the media playback system 100 configured in accordance with the various examples of the disclosure are described in greater detail below.

In the illustrated example of FIG. 1A, the environment 101 comprises a household having several rooms, spaces, and/or playback zones, including (clockwise from upper left) a master bathroom 101*a*, a master bedroom 101*b*, a second bedroom 101*c*, a family room or den 101*d*, an office 101*e*, a living room 101*f*, a dining room 101*g*, a kitchen 101*h*, and an outdoor patio 101*i*. While certain examples are described below in the context of a home environment, the technologies described herein may be implemented in other types of environments. In some examples, for instance, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in Figure TA. Each zone may be given a name according to a different room or space such as the office 101*e*, master bathroom 101*a*, master bedroom 101*b*, the second bedroom 101*c*, kitchen 101*h*, dining room 101*g*, living room 101*f*, and/or the balcony 101*i*. In some examples, a single playback zone may include multiple rooms or spaces. In certain examples, a single room or space may include multiple playback zones.

In the illustrated example of Figure TA, the master bathroom 101*a*, the second bedroom 101*c*, the office 101*e*, the living room 101*f*, the dining room 101*g*, the kitchen 101*h*, and the outdoor patio 101*i* each include one playback device 110, and the master bedroom 101*b* and the den 101*d* include a plurality of playback devices 110. In the master bedroom 101*b*, the playback devices 110*l* and 110*m* may be configured, for example, to play back audio content in synchrony as individual ones of playback devices 110, as a bonded playback zone, as a consolidated playback device, and/or any combination thereof. Similarly, in the den 101*d*, the playback devices 110*h-j* can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and TE.

In some examples, one or more of the playback zones in the environment 101 may each be playing different audio content. For instance, a user may be grilling on the patio 101*i* and listening to hip hop music being played by the playback device 110*c* while another user is preparing food in the kitchen 101*h* and listening to classical music played by the playback device 110*b*. In another example, a playback zone may play the same audio content in synchrony with another playback zone. For instance, the user may be in the office 101*e* listening to the playback device 110*f* playing back the same hip-hop music being played back by playback device 110*c* on the patio 101*i*. In some examples, the playback devices 110*c* and 110*f* play back the hip hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
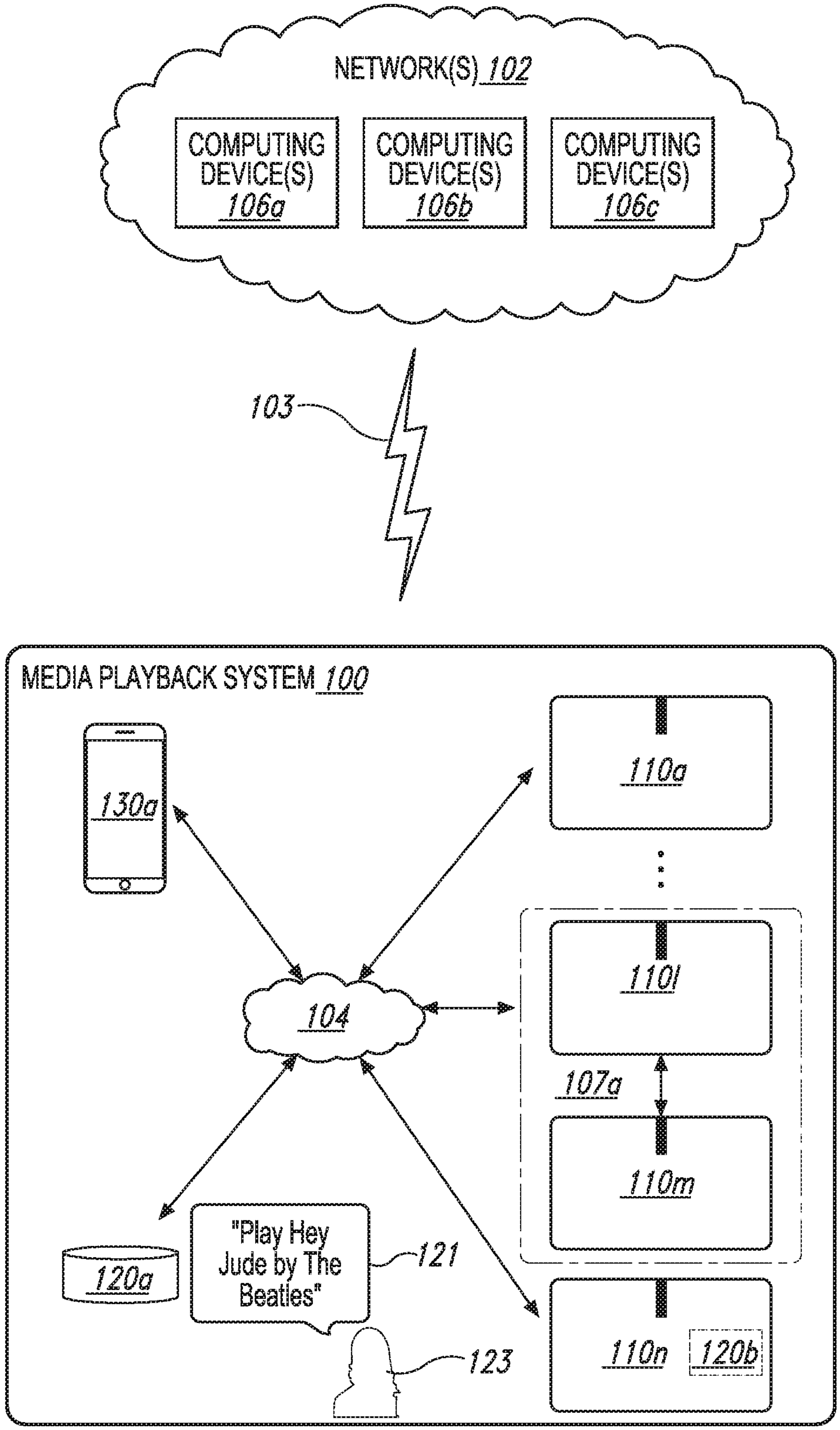
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/ or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some examples, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106*a*, a second computing device 106*b*, and a third computing device 106*c*). The computing devices 106 can comprise individual computers or servers, such as, for example, a media streaming service server storing audio and/or other media content, a voice service server, a social media server, a media playback system control server, etc. In some examples, one or more of the computing devices 106 comprise modules of a single computer or server. In certain examples, one or more of the computing devices 106 comprise one or more modules, computers, and/or servers. Moreover, while the cloud network 102 is described above in the context of a single cloud network, in some examples the cloud network 102 comprises a plurality of cloud networks comprising communicatively coupled computing devices. Furthermore, while the cloud network 102 is shown in FIG. 1B as having three of the computing devices 106, in some examples, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some examples, the network 104 comprises a dedicated communication network that the media playback system 100 uses to transmit messages between individual devices and/or to transmit media content to and from media content sources (e.g., one or more of the computing devices 106). In certain examples, the network 104 is configured to be accessible only to devices in the media playback system 100, thereby reducing interference and competition with other household devices. In other examples, however, the network 104 comprises an existing household communication network (e.g., a household WiFi network). In some examples, the links 103 and the network 104 comprise one or more of the same networks. In some examples, for example, the links 103 and the network 104 comprise a telecommunication network (e.g., an LTE network, a 5G network). Moreover, in some examples, the media playback system 100 is implemented without the network 104, and devices comprising the media playback system 100 can communicate with each other, for example, via one or more direct connections, PANs, telecommunication networks, and/or other suitable communication links.

In some examples, audio content sources may be regularly added or removed from the media playback system 100. In some examples, for instance, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some examples, for instance, the media content database is stored on one or more of the playback devices 110, network microphone devices 120, and/or control devices 130.

In the illustrated example of FIG. 1B, the playback devices 110*l* and 110*m* comprise a group 107*a*. The playback devices 110*l* and 110*m* can be positioned in different rooms in a household and be grouped together in the group 107*a* on a temporary or permanent basis based on user input received at the control device 130*a* and/or another control device 130 in the media playback system 100. When arranged in the group 107*a*, the playback devices 110*l* and 110*m* can be configured to play back the same or similar audio content in synchrony from one or more audio content sources. In certain examples, for instance, the group 107*a* comprises a bonded zone in which the playback devices 110*l* and 110*m* comprise left audio and right audio channels, respectively, of multi-channel audio content, thereby producing or enhancing a stereo effect of the audio content. In some examples, the group 107*a* includes additional playback devices 110. In other examples, however, the media playback system 100 omits the group 107*a* and/or other grouped arrangements of the playback devices 110.

The media playback system 100 includes the NMDs 120*a* and 120*d*, each comprising one or more microphones configured to receive voice utterances from a user. In the illustrated example of FIG. 1B, the NMD 120*a* is a standalone device and the NMD 120*d* is integrated into the playback device 110*n*. The NMD 120*a*, for example, is configured to receive voice input 121 from a user 123. In some examples, the NMD 120*a* transmits data associated with the received voice input 121 to a voice assistant service (VAS) configured to (i) process the received voice input data and (ii) transmit a corresponding command to the media playback system 100. In some examples, for instance, the computing device 106*c* comprises one or more modules and/or servers of a VAS (e.g., a VAS operated by one or more of SONOS®, AMAZON®, GOOGLE® APPLE®, MICROSOFT®). The computing device 106*c* can receive the voice input data from the NMD 120*a* via the network 104 and the links 103. In response to receiving the voice input data, the computing device 106*c* processes the voice input data (i.e., "Play Hey Jude by The Beatles"), and determines that the processed voice input includes a command to play a song (e.g., "Hey Jude"). The computing device 106*c* accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
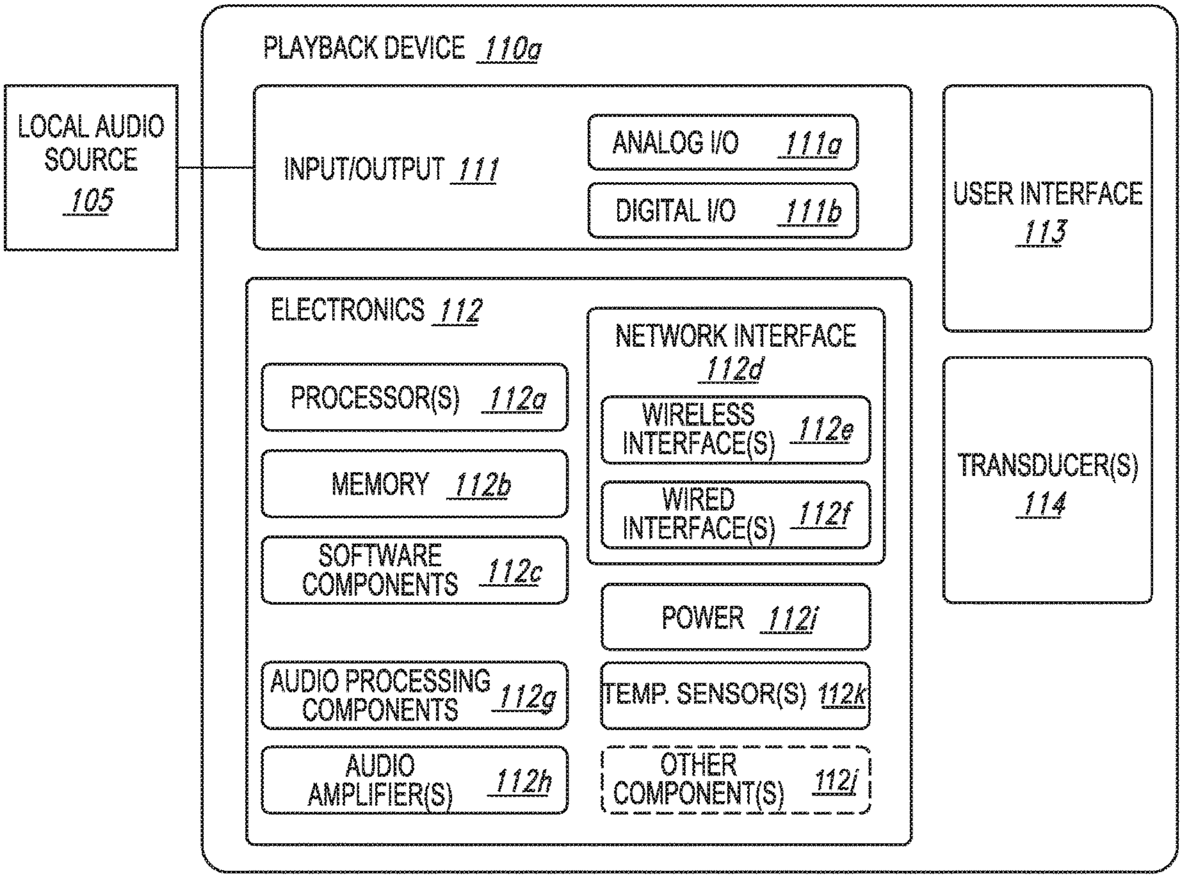
FIG. 1C is a block diagram of a playback device.

FIG. 1C is a block diagram of the playback device 110*a* comprising an input/output 111. The input/output 111 can include an analog I/O 111*a* (e.g., one or more wires, cables, and/or other suitable communication links configured to carry analog signals) and/or a digital I/O 111*b* (e.g., one or more wires, cables, or other suitable communication links configured to carry digital signals). In some examples, the analog I/O 111*a* is an audio line-in input connection comprising, for example, an auto-detecting 3.5 mm audio line-in connection. In some examples, the digital I/O 111*b* comprises a Sony/Philips Digital Interface Format (S/PDIF) communication interface and/or cable and/or a Toshiba Link (TOSLINK) cable. In some examples, the digital I/O 111*b* comprises a High-Definition Multimedia Interface (HDMI) interface and/or cable. In some examples, the digital I/O 111*b* includes one or more wireless communication links comprising, for example, a radio frequency (RF), infrared, WiFi, Bluetooth, or another suitable communication protocol. In certain examples, the analog I/O 111*a* and the digital 111*b* comprise interfaces (e.g., ports, plugs, jacks) configured to receive connectors of cables transmitting analog and digital signals, respectively, without necessarily including cables.

The playback device 110*a*, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some examples, the local audio source 105 includes local music libraries on a smartphone, a computer, a networked-attached storage (NAS), and/or another suitable device configured to store media files. In certain examples, one or more of the playback devices 110, NMDs 120, and/or control devices 130 comprise the local audio source 105. In other examples, however, the media playback system omits the local audio source 105 altogether. In some examples, the playback device 110*a* does not include an input/output 111 and receives all audio content via the network 104.

The playback device 110*a* further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106*a-c* via the network 104 (FIG. 1B)), amplify the received audio, and output the amplified audio for playback via one or more of the transducers 114. In some examples, the playback device 110*a* optionally includes one or more microphones 115 (e.g., a single microphone, a plurality of microphones, a microphone array) (hereinafter referred to as "the microphones 115"). In certain examples, for example, the playback device 110*a* having one or more of the optional microphones 115 can operate as an NMD configured to receive voice input from a user and correspondingly perform one or more operations based on the received voice input.

In the illustrated example of FIG. 1C, the electronics 112 comprise one or more processors 112*a* (referred to hereinafter as "the processors 112*a*"), memory 112*b*, software components 112*c*, a network interface 112*d*, one or more audio processing components 112*g* (referred to hereinafter as "the audio components 112*g*"), one or more audio amplifiers 112*h* (referred to hereinafter as "the amplifiers 112*h*"), and power 112*i* (e.g., one or more power supplies, power cables, power receptacles, batteries, induction coils, Power-over Ethernet (POE) interfaces, and/or other suitable sources of electric power). In some examples, the electronics 112 optionally include one or more other components 112*j* (e.g., one or more sensors, video displays, touchscreens, battery charging bases).

The processors 112*a* can comprise clock-driven computing component(s) configured to process data, and the memory 112*b* can comprise a computer-readable medium (e.g., a tangible, non-transitory computer-readable medium, data storage loaded with one or more of the software components 112*c*) configured to store instructions for performing various operations and/or functions. The processors 112*a* are configured to execute the instructions stored on the memory 112*b* to perform one or more of the operations. The operations can include, for example, causing the playback device 110*a* to retrieve audio data from an audio source (e.g., one or more of the computing devices 106*a-c* (FIG. 1B)), and/or another one of the playback devices 110. In some examples, the operations further include causing the playback device 110*a* to send audio data to another one of the playback devices 110*a* and/or another device (e.g., one of the NMDs 120). Certain examples include operations causing the playback device 110*a* to pair with another of the one or more playback devices 110 to enable a multi-channel audio environment (e.g., a stereo pair, a bonded zone).

The processors 112*a* can be further configured to perform operations causing the playback device 110*a* to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110*a* and the other one or more other playback devices 110. Additional details regarding audio playback synchronization among playback devices can be found, for example, in U.S. Pat. No. 8,234,395, which was incorporated by reference above.

In some examples, the memory 112*b* is further configured to store data associated with the playback device 110*a*, such as one or more zones and/or zone groups of which the playback device 110*a* is a member, audio sources accessible to the playback device 110*a*, and/or a playback queue that the playback device 110*a* (and/or another of the one or more playback devices) can be associated with. The stored data can comprise one or more state variables that are periodically updated and used to describe a state of the playback device 110*a*. The memory 112*b* can also include data associated with a state of one or more of the other devices (e.g., the playback devices 110, NMDs 120, control devices 130) of the media playback system 100. In some examples, for instance, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112*d* is configured to facilitate a transmission of data between the playback device 110*a* and one or more other devices on a data network such as, for example, the links 103 and/or the network 104 (FIG. 1B). The network interface 112*d* is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112*d* can parse the digital packet data such that the electronics 112 properly receives and processes the data destined for the playback device 110*a*.

In the illustrated example of FIG. 1C, the network interface 112*d* comprises one or more wireless interfaces 112*e* (referred to hereinafter as "the wireless interface 112*e*"). The wireless interface 112*e* (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some examples, the network interface 112*d* optionally includes a wired interface 112*f* (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain examples, the network interface 112*d* includes the wired interface 112*f* and excludes the wireless interface 112*e*. In some examples, the electronics 112 excludes the network interface 112*d* altogether and transmits and receives media content and/or other data via another communication path (e.g., the input/output 111).

The audio components 112*g* are configured to process and/or filter data comprising media content received by the electronics 112 (e.g., via the input/output 111 and/or the network interface 112*d*) to produce output audio signals. In some examples, the audio processing components 112*g* comprise, for example, one or more digital-to-analog converters (DAC), audio preprocessing components, audio enhancement components, a digital signal processors (DSPs), and/or other suitable audio processing components, modules, circuits, etc. In certain examples, one or more of the audio processing components 112*g* can comprise one or more subcomponents of the processors 112*a*. In some examples, the electronics 112 omits the audio processing components 112*g*. In some examples, for instance, the processors 112*a* execute instructions stored on the memory 112*b* to perform audio processing operations to produce the output audio signals.

The amplifiers 112*h* are configured to receive and amplify the audio output signals produced by the audio processing components 112*g* and/or the processors 112*a*. The amplifiers 112*h* can comprise electronic devices and/or components configured to amplify audio signals to levels sufficient for driving one or more of the transducers 114. In some examples, for instance, the amplifiers 112*h* include one or more switching or class-D power amplifiers. In other examples, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain examples, the amplifiers 112*h* comprise a suitable combination of two or more of the foregoing types of power amplifiers. Moreover, in some examples, individual ones of the amplifiers 112*h* correspond to individual ones of the transducers 114. In other examples, however, the electronics 112 includes a single one of the amplifiers 112*h* configured to output amplified audio signals to a plurality of the transducers 114. In some other examples, the electronics 112 omits the amplifiers 112*h*.

The transducers 114 (e.g., one or more speakers and/or speaker drivers) receive the amplified audio signals from the amplifier 112*h* and render or output the amplified audio signals as sound (e.g., audible sound waves having a frequency between about 20 Hertz (Hz) and 20 kilohertz (kHz)). In some examples, the transducers 114 can comprise a single transducer. In other examples, however, the transducers 114 comprise a plurality of audio transducers. In some examples, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain examples, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
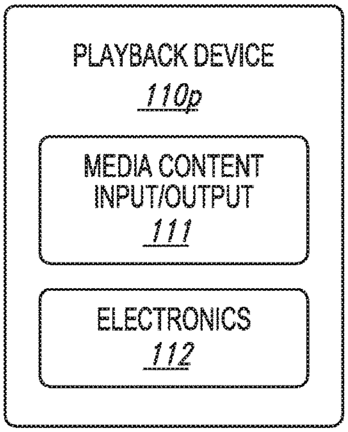
FIG. 1D is a block diagram of a playback device.

By way of illustration, SONOS, Inc. presently offers (or has offered) for sale certain playback devices including, for example, a "SONOS ONE," "MOVE," "PLAY:5," "BEAM," "PLAYBAR," "PLAYBASE," "PORT," "BOOST," "AMP," and "SUB." Other suitable playback devices may additionally or alternatively be used to implement the playback devices of example examples disclosed herein. Additionally, one of ordinary skilled in the art will appreciate that a playback device is not limited to the examples described herein or to SONOS product offerings. In some examples, for example, one or more playback devices 110 comprises wired or wireless headphones (e.g., over-the-ear headphones, on-ear headphones, in-ear earphones). In other examples, one or more of the playback devices 110 comprise a docking station and/or an interface configured to interact with a docking station for personal mobile media playback devices. In certain examples, a playback device may be integral to another device or component such as a television, a lighting fixture, or some other device for indoor or outdoor use. In some examples, a playback device omits a user interface and/or one or more transducers. For example, FIG. 1D is a block diagram of a playback device 110*p* comprising the input/output 111 and electronics 112 without the user interface 113 or transducers 114.

Figure 1E:
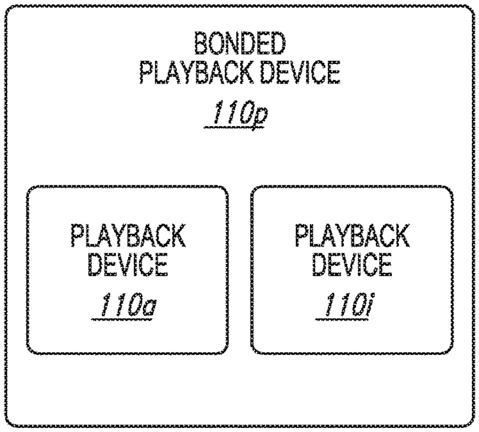
FIG. 1E is a block diagram of a network microphone device.

FIG. 1E is a block diagram of a bonded playback device 110*q* comprising the playback device 110*a* (FIG. 1C) sonically bonded with the playback device 110*i* (e.g., a subwoofer) (FIG. 1A). In the illustrated example, the playback devices 110*a* and 110*i* are separate ones of the playback devices 110 housed in separate enclosures. In some examples, however, the bonded playback device 110*q* comprises a single enclosure housing both the playback devices 110*a* and 110*i*. The bonded playback device 110*q* can be configured to process and reproduce sound differently than an unbonded playback device (e.g., the playback device 110*a* of FIG. 1C) and/or paired or bonded playback devices (e.g., the playback devices 110*l* and 110*m* of FIG. 1B). In some examples, for instance, the playback device 110*a* is full-range playback device configured to render low frequency, mid-range frequency, and high frequency audio content, and the playback device 110*i* is a subwoofer configured to render low frequency audio content. In some examples, the playback device 110*a*, when bonded with the first playback device, is configured to render only the mid-range and high frequency components of a particular audio content, while the playback device 110*i* renders the low frequency component of the particular audio content. In some examples, the bonded playback device 110*q* includes additional playback devices and/or another bonded playback device. Additional playback device examples are described in further detail below with respect to FIGS. 2A-2C.

c. Suitable Network Microphone Devices (NMDs)

Figure 1F:
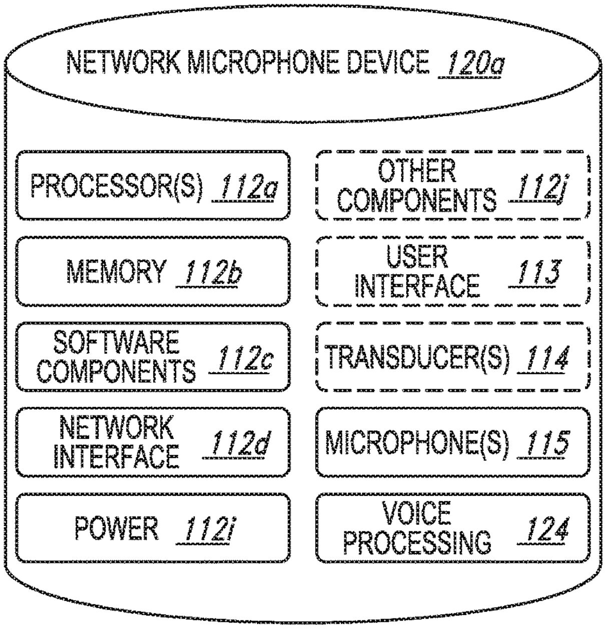
FIG. 1F is a block diagram of a network microphone device.

FIG. 1F is a block diagram of the NMD 120*a* (FIGS. 1A and 1B). The NMD 120*a* includes one or more voice processing components 124 (hereinafter "the voice components 124") and several components described with respect to the playback device 110*a* (FIG. 1C) including the processors 112*a*, the memory 112*b*, and the microphones 115. The NMD 120*a* optionally comprises other components also included in the playback device 110*a* (FIG. 1C), such as the user interface 113 and/or the transducers 114. In some examples, the NMD 120*a* is configured as a media playback device (e.g., one or more of the playback devices 110), and further includes, for example, one or more of the audio components 112*g* (FIG. 1C), the amplifiers 114, and/or other playback device components. In certain examples, the NMD 120*a* comprises an Internet of Things (IoT) device such as, for example, a thermostat, alarm panel, fire and/or smoke detector, etc. In some examples, the NMD 120*a* comprises the microphones 115, the voice processing components 124, and only a portion of the components of the electronics 112 described above with respect to FIG. 1B. In some examples, for instance, the NMD 120*a* includes the processor 112*a* and the memory 112*b* (FIG. 1B), while omitting one or more other components of the electronics 112. In some examples, the NMD 120*a* includes additional components (e.g., one or more sensors, cameras, thermometers, barometers, hygrometers).

Figure 1G:
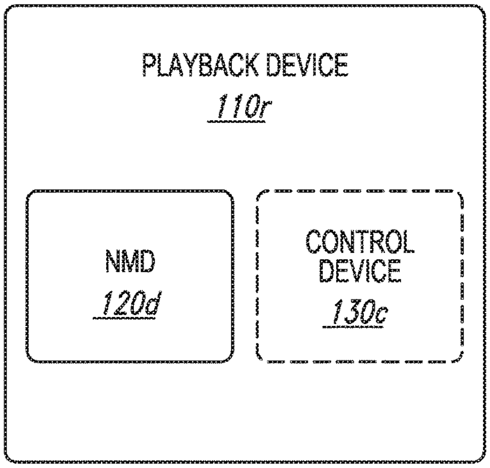
FIG. 1G is a block diagram of a playback device.

In some examples, an NMD can be integrated into a playback device. FIG. 1G is a block diagram of a playback device 110*r* comprising an NMD 120*d*. The playback device 110*r* can comprise many or all of the components of the playback device 110*a* and further include the microphones 115 and voice processing components 124 (FIG. 1F). The playback device 110*r* optionally includes an integrated control device 130*c*. The control device 130*c* can comprise, for example, a user interface (e.g., the user interface 113 of FIG. 1B) configured to receive user input (e.g., touch input, voice input) without a separate control device. In other examples, however, the playback device 110*r* receives commands from another control device (e.g., the control device 130*a* of FIG. 1B).

Referring again to FIG. 1F, the microphones 115 are configured to acquire, capture, and/or receive sound from an environment (e.g., the environment 101 of FIG. 1A) and/or a room in which the NMD 120*a* is positioned. The received sound can include, for example, vocal utterances, audio played back by the NMD 120*a* and/or another playback device, background voices, ambient sounds, etc. The microphones 115 convert the received sound into electrical signals to produce microphone data. The voice processing components 124 receive and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Sin" for invoking the APPLE® VAS.

After detecting the activation word, voice processing components 124 monitor the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

Figure 1H:
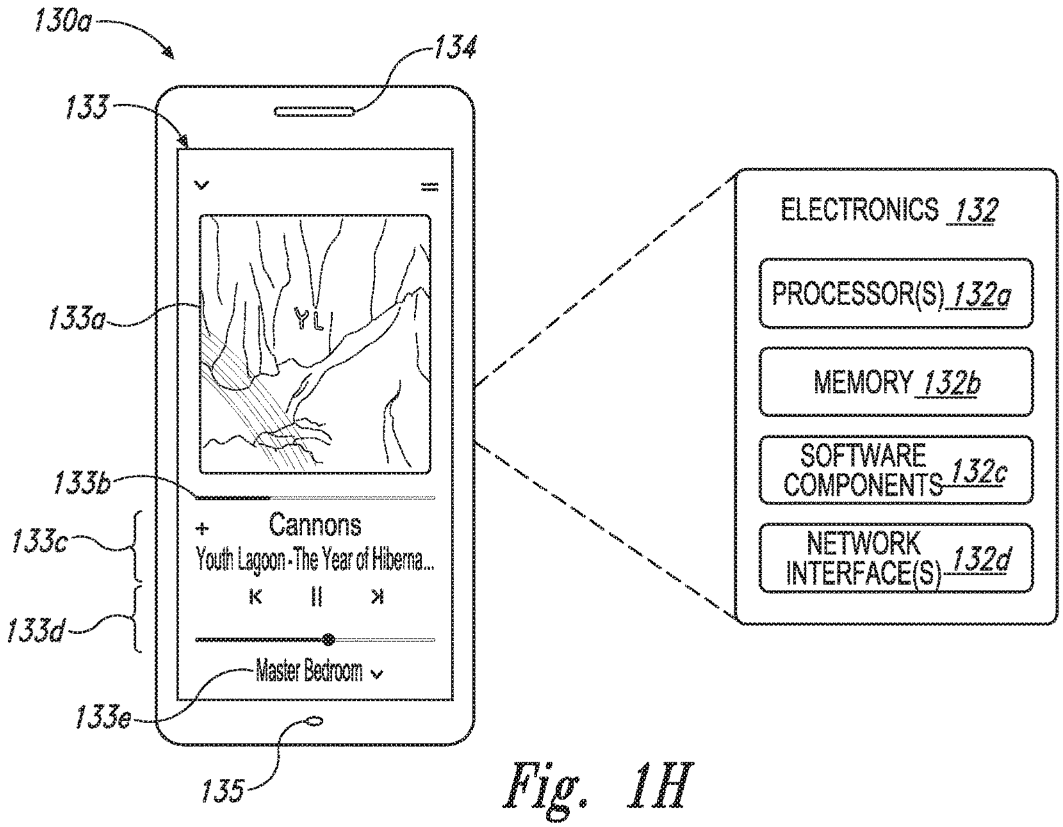
FIG. 1H is a partially schematic diagram of a control device.

FIG. 1H is a partially schematic diagram of the control device 130*a* (FIGS. 1A and 1B). As used herein, the term "control device" can be used interchangeably with "controller" or "control system." Among other features, the control device 130*a* is configured to receive user input related to the media playback system 100 and, in response, cause one or more devices in the media playback system 100 to perform an action(s) or operation(s) corresponding to the user input. In the illustrated example, the control device 130*a* comprises a smartphone (e.g., an iPhone™, an Android phone) on which media playback system controller application software is installed. In some examples, the control device 130*a* comprises, for example, a tablet (e.g., an iPad™), a computer (e.g., a laptop computer, a desktop computer), and/or another suitable device (e.g., a television, an automobile audio head unit, an IoT device). In certain examples, the control device 130*a* comprises a dedicated controller for the media playback system 100. In other examples, as described above with respect to FIG. 1G, the control device 130*a* is integrated into another device in the media playback system 100 (e.g., one more of the playback devices 110, NMDs 120, and/or other suitable devices configured to communicate over a network).

The control device 130*a* includes electronics 132, a user interface 133, one or more speakers 134, and one or more microphones 135. The electronics 132 comprise one or more processors 132*a* (referred to hereinafter as "the processors 132*a*"), a memory 132*b*, software components 132*c*, and a network interface 132*d*. The processor 132*a* can be configured to perform functions relevant to facilitating user access, control, and configuration of the media playback system 100. The memory 132*b* can comprise data storage that can be loaded with one or more of the software components executable by the processor 132*a* to perform those functions. The software components 132*c* can comprise applications and/or other executable software configured to facilitate control of the media playback system 100. The memory 112*b* can be configured to store, for example, the software components 132*c*, media playback system controller application software, and/or other data associated with the media playback system 100 and the user.

The network interface 132*d* is configured to facilitate network communications between the control device 130*a* and one or more other devices in the media playback system 100, and/or one or more remote devices. In some examples, the network interface 132*d* is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132*d* can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132*d* can transmit a playback device control command (e.g., volume control, audio playback control, audio content selection) from the control device 130 to one or more of the playback devices 110. The network interface 132*d* can also transmit and/or receive configuration changes such as, for example, adding/removing one or more playback devices 110 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133*b* (e.g., an elapsed and/or remaining time indicator), media content information region 133*c*, a playback control region 133*d*, and a zone indicator 133*e*. The media content information region 133*c* can include a display of relevant information (e.g., title, artist, album, genre, release year) about media content currently playing and/or media content in a queue or playlist. The playback control region 133*d* can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133*d* may also include selectable icons to modify equalization settings, playback volume, and/or other suitable playback actions. In the illustrated example, the user interface 133 comprises a display presented on a touch screen interface of a smartphone (e.g., an iPhone™, an Android phone). In some examples, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130*a*. In some examples, the one or more speakers comprise individual transducers configured to correspondingly output low frequencies, mid-range frequencies, and/or high frequencies. In some examples, for instance, the control device 130*a* is configured as a playback device (e.g., one of the playback devices 110). Similarly, in some examples the control device 130*a* is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some examples, two or more of the microphones 135 are arranged to capture location information of an audio source (e.g., voice, audible sound) and/or configured to facilitate filtering of background noise. Moreover, in certain examples, the control device 130*a* is configured to operate as playback device and an NMD. In other examples, however, the control device 130*a* omits the one or more speakers 134 and/or the one or more microphones 135. For instance, the control device 130*a* may comprise a device (e.g., a thermostat, an IoT device, a network device) comprising a portion of the electronics 132 and the user interface 133 (e.g., a touch screen) without any speakers or microphones.

III. Example Systems and Devices a. Suitable Playback Devices

Figure 2A:
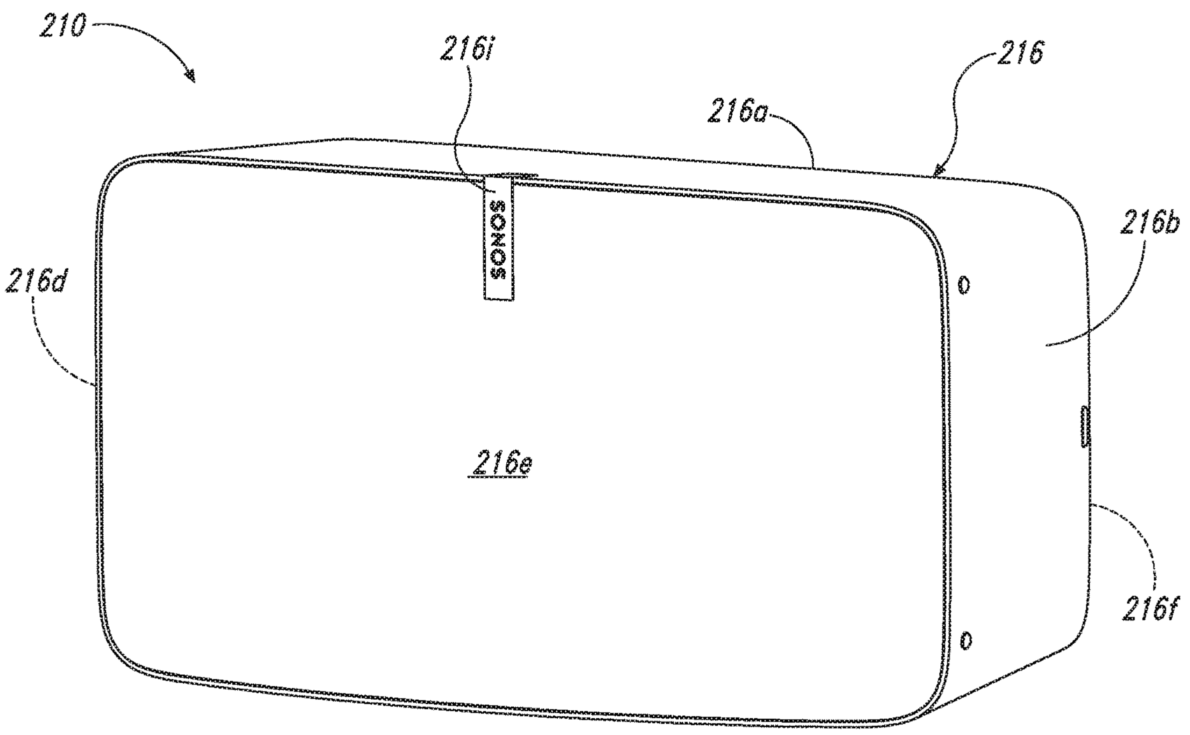
FIG. 2A is a front isometric view of a playback device configured in accordance with examples of the disclosed technology.
Figure 2B:
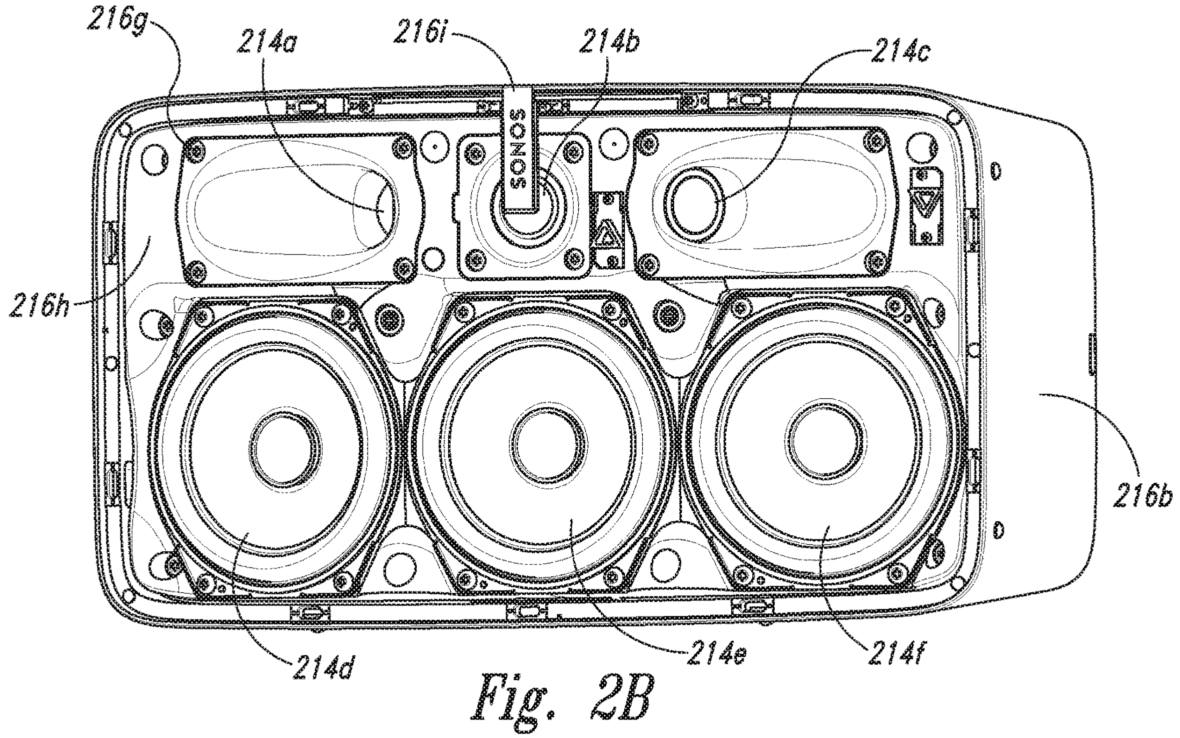
FIG. 2B is a front isometric view of the playback device of FIG. 3A without a grille.
Figure 2C:
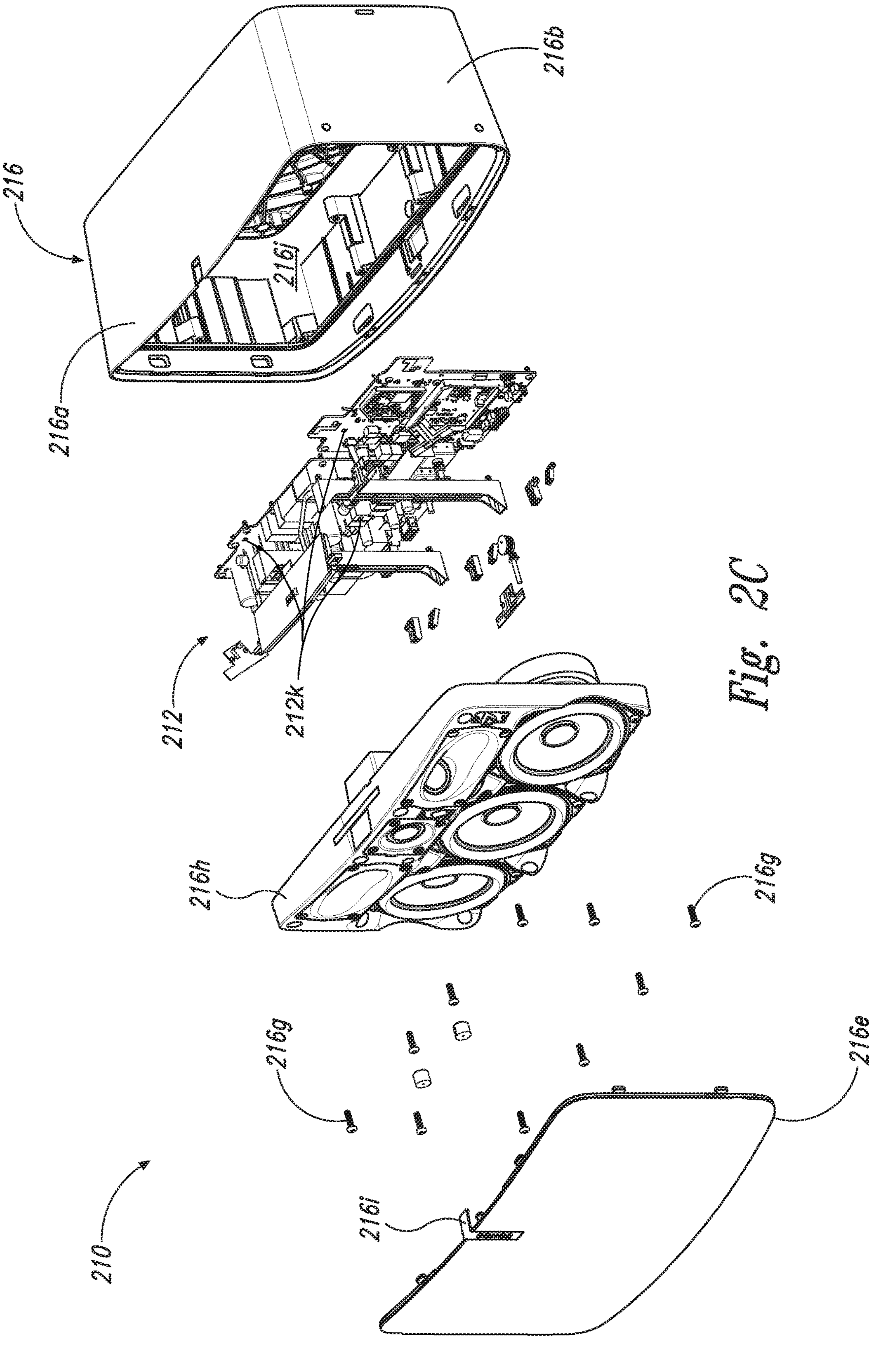
FIG. 2C is an exploded view of the playback device of FIG. 2A.

FIG. 2A is a front isometric view of a playback device 210 configured in accordance with examples of the disclosed technology. FIG. 2B is a front isometric view of the playback device 210 without a grille 216*e*. FIG. 2C is an exploded view of the playback device 210. Referring to FIGS. 2A-2C together, the playback device 210 comprises a housing 216 that includes an upper portion 216*a*, a right or first side portion 216*b*, a lower portion 216*c*, a left or second side portion 216*d*, the grille 216*e*, and a rear portion 216*f*. A plurality of fasteners 216*g* (e.g., one or more screws, rivets, clips) attaches a frame 216*h* to the housing 216. A cavity 216*j* (FIG. 2C) in the housing 216 is configured to receive the frame 216*h* and electronics 212. The frame 216*h* is configured to carry a plurality of transducers 214 (identified individually in FIG. 2B as transducers 214*a-f*). The electronics 212 (e.g., the electronics 112 of FIG. 1C) is configured to receive audio content from an audio source and send electrical signals corresponding to the audio content to the transducers 214 for playback.

The transducers 214 are configured to receive the electrical signals from the electronics 112, and further configured to convert the received electrical signals into audible sound during playback. For instance, the transducers 214*a-c* (e.g., tweeters) can be configured to output high frequency sound (e.g., sound waves having a frequency greater than about 2 kHz). The transducers 214*d-f* (e.g., mid-woofers, woofers, midrange speakers) can be configured output sound at frequencies lower than the transducers 214*a-c* (e.g., sound waves having a frequency lower than about 2 kHz). In some examples, the playback device 210 includes a number of transducers different than those illustrated in FIGS. 2A-2C. For example, the playback device 210 can include fewer than six transducers (e.g., one, two, three). In other examples, however, the playback device 210 includes more than six transducers (e.g., nine, ten). Moreover, in some examples, all or a portion of the transducers 214 are configured to operate as a phased array to desirably adjust (e.g., narrow or widen) a radiation pattern of the transducers 214, thereby altering a user's perception of the sound emitted from the playback device 210.

In the illustrated example of FIGS. 2A-2C, a filter 216*i* is axially aligned with the transducer 214*b*. The filter 216*i* can be configured to desirably attenuate a predetermined range of frequencies that the transducer 214*b* outputs to improve sound quality and a perceived sound stage output collectively by the transducers 214. In some examples, however, the playback device 210 omits the filter 216*i*. In other examples, the playback device 210 includes one or more additional filters aligned with the transducers 214*b* and/or at least another of the transducers 214.

Figure 3A:
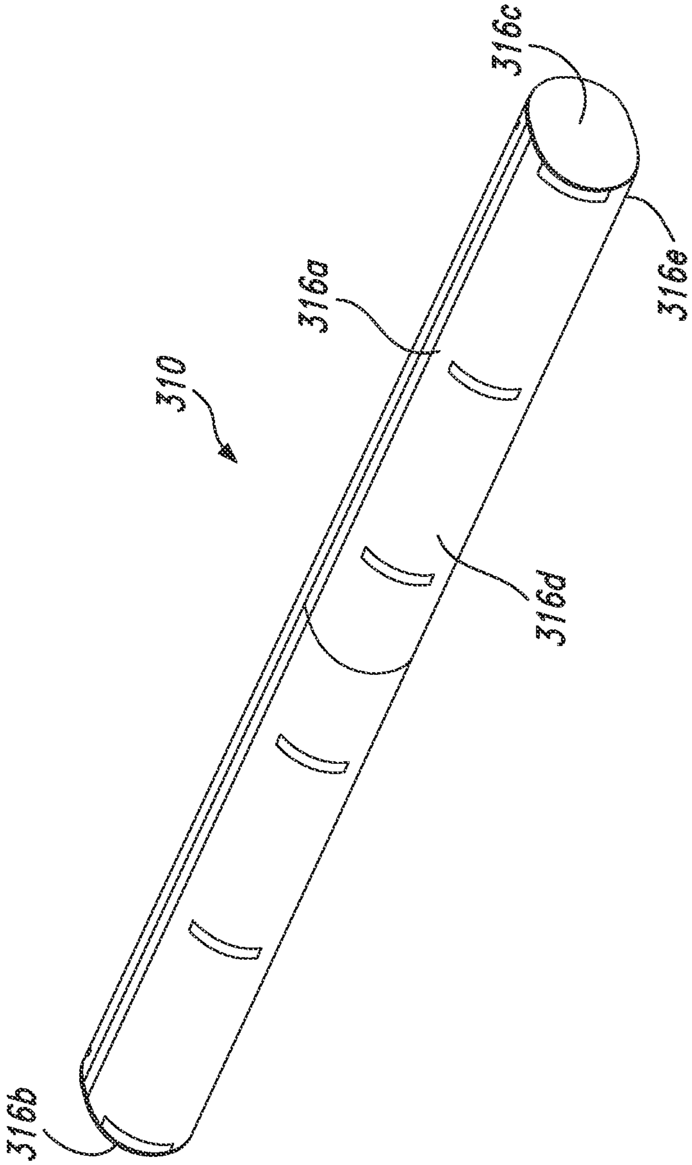
FIG. 3A is a perspective view of a playback device configured in accordance with examples of the disclosed technology.
Figure 3B:
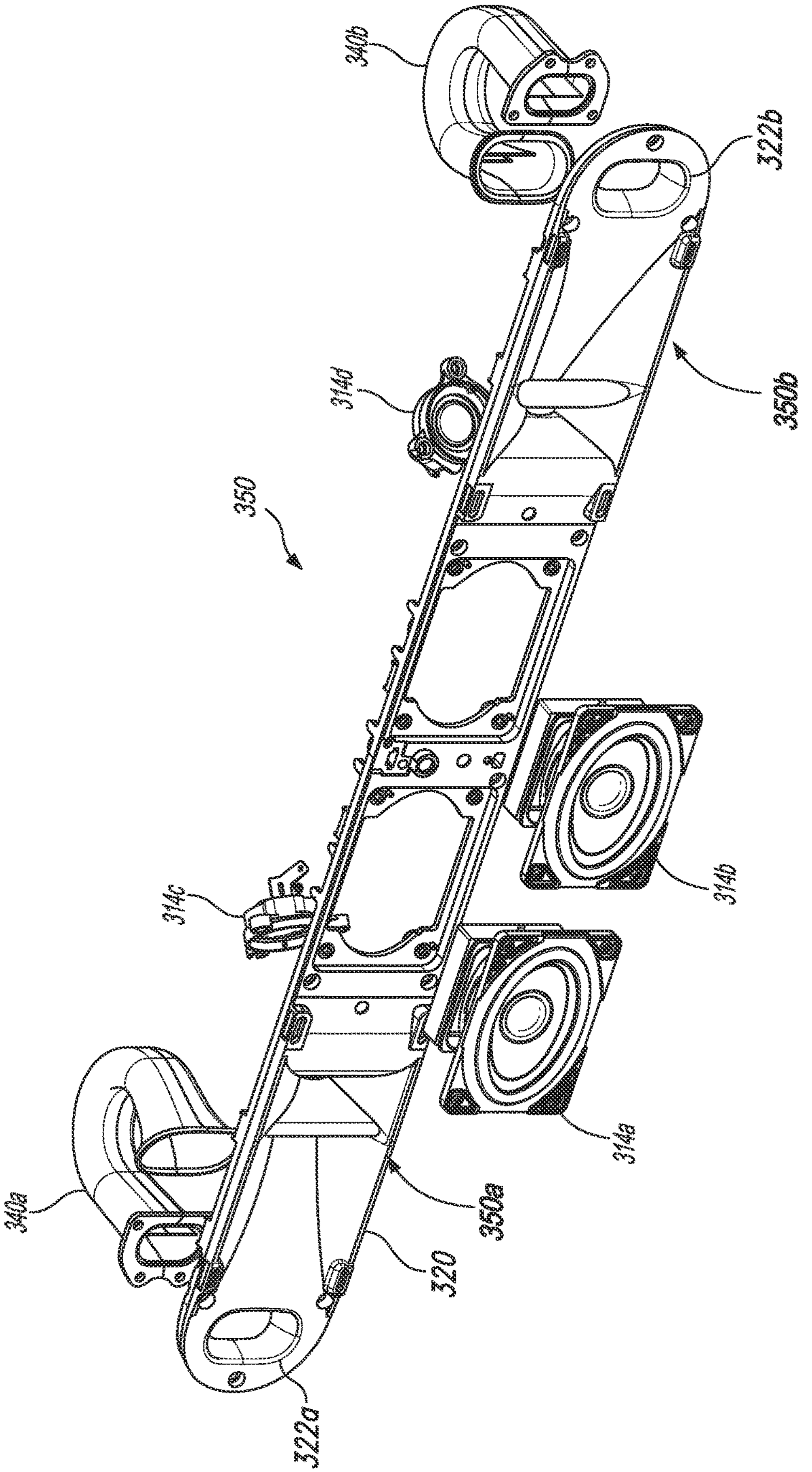
FIG. 3B is an exploded view of the playback device of FIG. 3A with some components hidden.
Figure 3C:
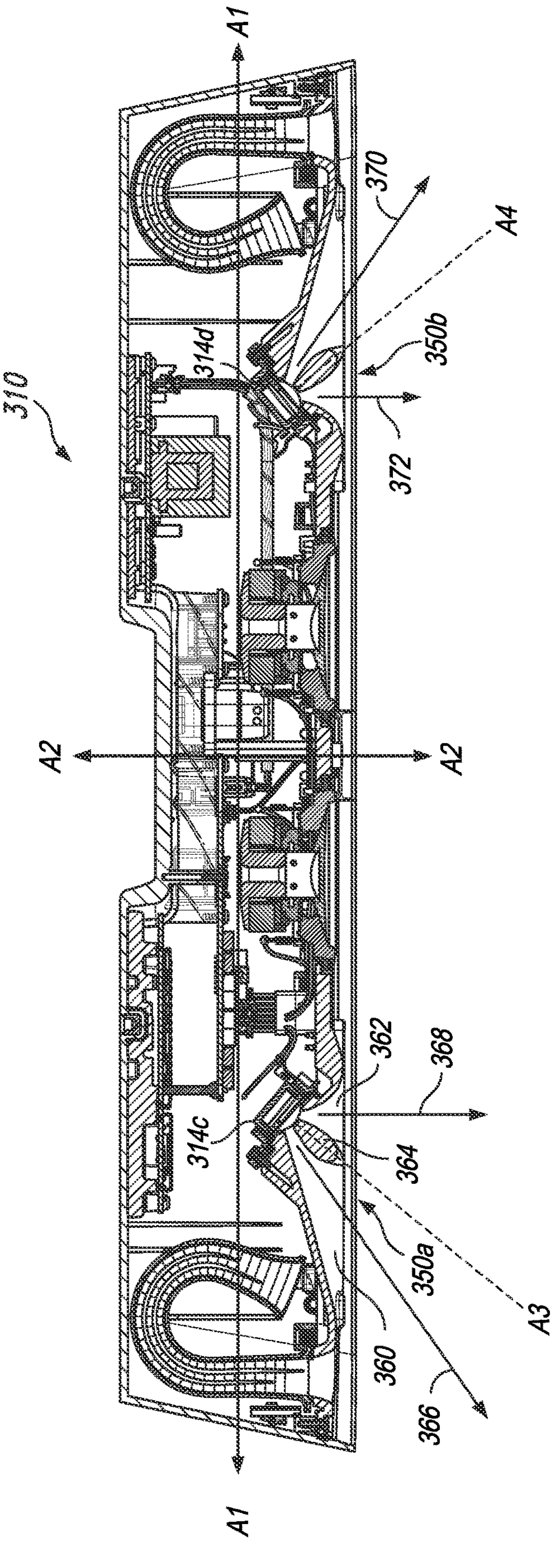
FIG. 3C is a top sectional view of the playback device of FIG. 3A.

FIG. 3A is a perspective view of a playback device 310, FIG. 3B shows the playback device 310 in an exploded view with some components hidden for clarity, and FIG. 3C shows a top sectional view of the playback device 310. In some examples, the playback device 310 takes the form of a soundbar that is elongated along the length of the playback device 310 along axis A1 (FIG. 3C) and is configured to face along a forward axis A2 (FIG. 3C) that is substantially orthogonal to the longitudinal axis A1 the playback device 310. In various examples, the playback device 310 has other forms, for instance, having more or fewer transducers, having other form-factors, having more or fewer acoustic waveguides, and/or having any other suitable modifications with respect to the example shown in FIGS. 3A-C.

The playback device 310 includes a body defined by housing 316 or enclosure, which is elongated along the longitudinal axis A1. The housing 316 defines an interior volume therein, and includes an upper portion 316*a*, a first side or left portion 316*b*, an opposing second side or right portion 316*c*, and a forward portion 316*d*, and a lower portion 316*e*. In some examples, the housing 316 can define a curved surface, for instance, with a curved transition between the upper portion 316*a* and the forward portion 316*d*, and/or with a curved transition between the forward portion 316*d* and the lower portion 316*e*. Such curved profiles can be particularly desirable from a design perspective, as the human eye tends to perceive objects with curved profiles as occupying a smaller volume. As such, a soundbar or other such playback device can appear smaller and more discreet by employing curved transitions along the outer surface.

As shown in FIG. 3B, a frame 320 can be positioned within the housing 316. The frame 320 can define a plurality of openings configured to receive one or more transducers 314*a-d* (collectively "transducers 314") therein. For example, the frame 320 can couple to transducers 314*a*, 314*b*, 314*c* and 314*d*. The transducers 314 coupled to the frame 320 and disposed within the housing 316 can be similar or identical to any one of the transducers 214*a-f* described previously.

The playback device 310 can include one or more acoustic ports 340*a* and 340*b* (collectively "acoustic ports 340"). In various examples, the ports 340 can take the form of a conduit, duct, tube, or any other suitable structure. In some examples, the acoustic ports 340 can be a bass reflex port. The acoustic ports 340 can allow for air to flow through from outside of the playback device 310 to the internal volume of the playback device 310. The frame 320 can define a plurality of openings to receive the acoustic ports 340. The ports can include any of the features of acoustic ports as described in commonly owned U.S. Application No. 63/199,716, filed Jan. 19, 2021 and titled "Acoustic Port for a Playback Device," which is incorporated herein by reference in its entirety.

In the illustrated example, the forward-firing transducers 314*a* and 314*b* face along the forward direction (e.g., substantially normal to the long axis of the playback device 310), while the first side-firing transducer 314*c* is oriented leftward with respect to the forward direction and the second side-firing transducer 314*d* is oriented rightward with respect to the forward direction.

The playback device 310 also includes a first waveguide 350*a* disposed adjacent the first side-firing transducer 314*c* and a second waveguide 350*b* disposed adjacent the second side-firing transducer 314*d* (collectively "waveguides 350"). In various examples, the waveguides 350 can be formed as part of, or be contiguous or continuous with, the frame 320. Each of the waveguides 350 can take the form of a horn, conduit, duct, channel, or other suitable structure configured to guide sound waves along an intended direction or along multiple directions. In some examples, the waveguides can be substantially symmetrical to one another and oriented in opposite directions reflected about the forward axis A2. In operation, each waveguide 350 is configured to direct sound from its respective side-firing transducer 314 along the desired directions. As described in more detail below, the particular configuration of the waveguides 350 allows for acoustic energy output via a single side-firing transducer 314 to be directed along two distinct axes in a manner that achieves beneficial psychoacoustic effects for the listener. In particular, each of the waveguides 350 can include a plurality of chambers or cavities that each direct sound along a particular direction. By directing a first proportion of the acoustic energy along a generally forward direction directly towards a user, and directing a second proportion of the acoustic energy along a side-propagating direction that reflects off a wall before reaching the user, the user may localize the resulting sound as originating from a position between the reflection point and the transducer, thereby achieving the desired spaciousness associated with home-theatre and surround-sound audio.

b. Waveguides for Side-Firing Audio Transducers

FIG. 3C is a top sectional view of the playback device 310. As noted above, the playback device 310 is elongated along a longitudinal axis A1, and the forward axis A2 extends orthogonal to the longitudinal axis A1. In general, the playback device 310 can be configured to play back audio to one or more users who are positioned in front of the playback device 310 (e.g., spaced apart from the playback device 310 along the forward axis A2 and generally positioned along the forward axis A2). As illustrated, the left side-firing transducer 314*c* can be oriented along a first side axis A3 that is angled with respect to the forward axis A2. Similarly, the right side-firing transducer 314*d* can be oriented along a second side axis A4 that is angled with respect to the forward axis A2 in the opposite direction. In various examples, the side axes A3 and A4 can each be angled with respect to the forward axis A2 by about 30, 35, 40, 45, 50, 55, or about 60 degrees.

The first waveguide 350*a* is positioned adjacent to (e.g., in front of) and in fluid communication with the left side-firing transducer 314*c*, and the second waveguide 350*b* is positioned adjacent to (e.g., in front of) and in fluid communication with the right side-firing transducer 314*d*. The first waveguide 350*a* defines a first chamber 360 and a second chamber 362 separated by a divider 364. Each chamber is configured to direct sound along a respective direction: the first chamber 360 directs acoustic energy along a first direction 366 and the second chamber 362 directs acoustic energy along a second direction 368, the first and second directions 366, 368 diverging from one another as they move away from the transducer 314*c*.

In the illustrated example, the first direction 366 is a side-propagating direction, for example lying between the longitudinal axis A1 of the playback device 310 and the third axis A3 along which the side-firing transducer 314*c* is oriented. In various examples, the first direction 366 can be angled with respect to the forward axis A2 of the playback device 310 by about 45, 50, 55, 60, 65, 70, or about 75 degrees.

In the illustrated example, the second direction 368 is a substantially forward-propagating direction. The second direction can be substantially parallel to the forward axis A2, or may lie somewhere between the forward axis A2 and the third axis A3 along which the side-firing transducer is oriented. In various examples, the second direction 368 is more aligned with the forward axis A2 than with the first side axis A3 or with the first direction 366. In some examples, the first and second directions 366, 368 are equally divergent from the side axis A3 (e.g., each diverging from the side axis A3 by the same angular magnitude but in opposite directions).

The second waveguide 350*b* may similarly include discrete cavities or chambers separated by a divider such that acoustic energy is directed along a second side-propagating direction 370 and also along a second forward-propagating direction 372. In some examples, the second forward-propagating direction 372 can be substantially parallel to both the forward axis A2 and the forward-propagating direction 368 of the first waveguide 350*a*. Additionally or alternatively, the second side-propagating direction 370 can be symmetrical to the first side-propagating direction 366 about the forwards axis A2. In at least some examples, the second forward-propagating direction 372 and/or the second side-propagating direction 370 may not be symmetrical to the respective first forward-propagating direction 368 and the first side-propagating direction 366 about the forward axis A2.

In operation, and as described in more detail elsewhere herein, audio played back via the side-firing transducer 314*c* is directed, via the first waveguide 350*a*, along two distinct directions: a first portion of the acoustic energy is directed along the side-propagating direction 366 (and may reach a user after reflecting off a wall or other surface), and a second portion of the acoustic energy is directed along the forward-propagating direction 368 (and may reach a user directly without intervening reflection). By selecting the geometry of the first chamber 360, the second chamber 362, and the divider 364, the relative proportion of acoustic energy directed along each direction can be controlled. In some examples, it is beneficial to direct a greater proportion of acoustic energy along the side-propagating direction 366 than the forward-propagating direction 368 (e.g., about 5 dB or more greater, about 10 dB or more greater, etc.) such that the user perceives the sound as originating from a location between the transducer 314*c* and the reflection point.

Figure 4:
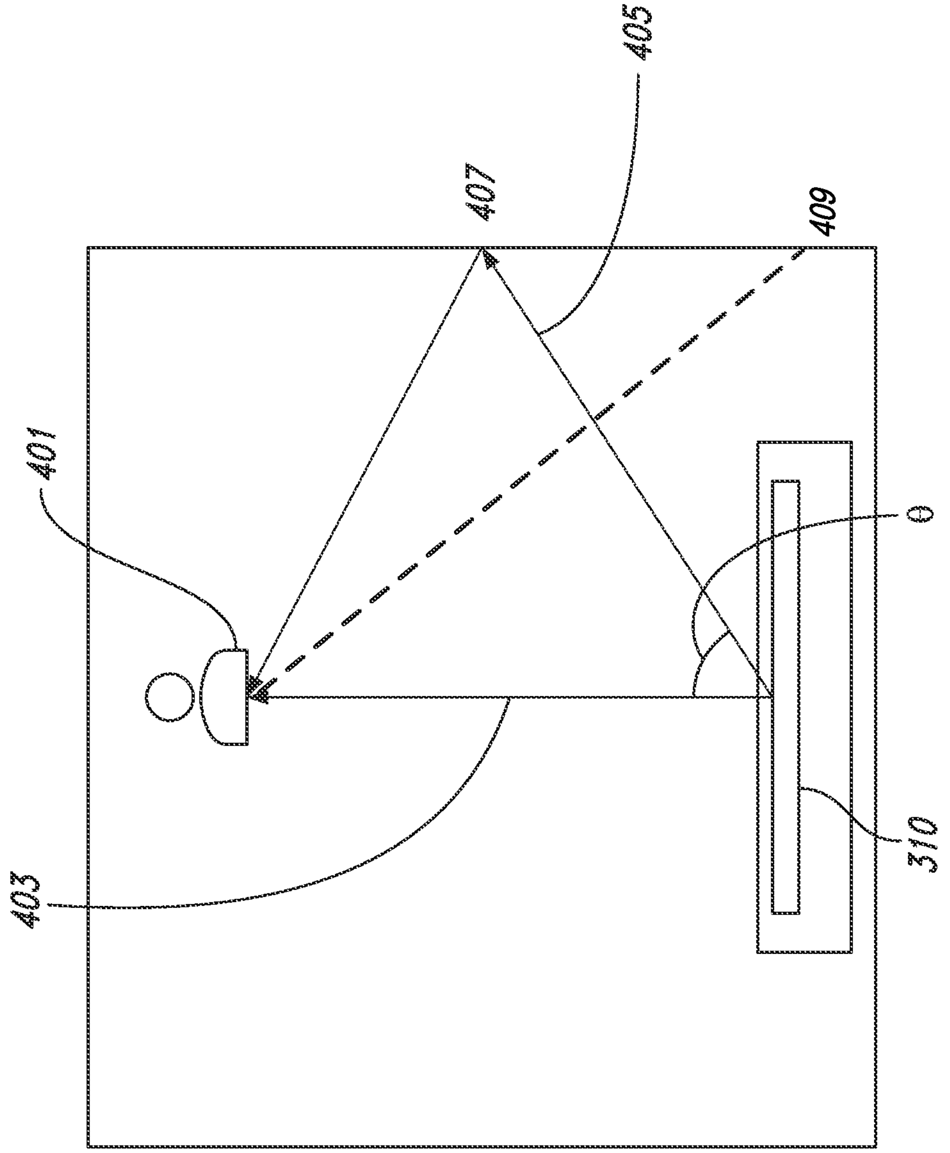
FIG. 4 is a schematic top view of a user and a playback device in an environment in accordance with examples of the disclosed technology.

FIG. 4 is a schematic top illustration of a user 401 sitting in relation to an audio playback device 310 in a room. As illustrated, audio output via the playback device 310 can reach the user via at least two paths: audio 403 propagates along the forward direction directly to the user 401, while audio 405 propagates along a side direction towards a reflection point 407 on a wall, from which the reflected audio is directed towards the user 401. In conventional approaches with side-firing transducers, left channel audio is played back only along the direction of audio 405 to be reflected at point 407 before reaching the user. In this case, the user will localize the source of the audio as the reflection point 407 on the wall. Although reflecting sound off the wall provides increased spaciousness, it is often undesirable for the user to localize the side-firing audio content as originating from the reflection point 407. Instead, it may be desirable for the user to localize the side-firing audio content as originating from a direction between the reflection point 407 and the playback device 310. In the illustrated example, an intended localization direction 409 is shown in a dashed line. For example, left front channel audio is generally intended to be played back to the user from a location that is offset from the forward axis of the playback device 310 by a 30-degree angle. As such, in some examples, the intended localization direction 409 can be offset from the forward axis of the playback device 310 (and the direction of audio 403) by between about 20 and 40 degrees, or about 30 degrees.

To provide audio output that the user 401 localizes along direction 409, dual-chamber waveguides as described herein can be used in conjunction with side-firing transducers. In particular, such waveguides can direct side-firing acoustic energy along two distinct directions. While a portion of the side-firing transducer output is directed along the direction of audio 405 towards the wall, another portion of the side-firing transducer output is directed along the direction of audio 403, directly towards the user 401. As noted previously, when identical (or substantially identical) sounds reach the user 401 from two different locations (e.g., the playback device 310 and the reflection point 407), the user 401 will generally perceive the sounds as a single fused sound and as arriving from a location between those two locations. However, due to the precedence effect, since audio 403 will reach the user before audio 405 (due to the longer path length of the audio 405), the apparent location of the perceived sound to the user 401 will be dominated by the origin of audio 403. As such, given the same amplitudes of the forward-propagating signal (audio 403) and the side-propagating signal (audio 405), the user 401 will localize the audio as originating from a location nearer to the playback device 310 than to the reflection point 407. This is generally undesirable as the audio content routed to a side-firing transducer is intended to be perceived by the user as originating from a location offset from the soundbar (e.g., along direction 409).

To achieve the desired psychoacoustic effect (e.g., the user localizing the side-firing audio content as originating from direction 409), it is beneficial to control the relative amplitudes of acoustic energy directed along each of the two directions. In particular, by directing a greater proportion of the acoustic energy as side-propagating audio 405 than as forward-propagating audio 403 (e.g., by at least 5 dB or more greater, at least 10 dB or more greater, etc.), the user 401 will localize the sound as originating from an area between the reflection point 407 and the playback device 403 (e.g., along direction 409), notwithstanding the fact that the forward-propagating audio 403 reaches the user first. The particular proportions of acoustic energy directed along each axis, and the axes themselves, can be determined based on the geometry and dimensions of the waveguide. For example, the chambers of the waveguide can be controlled by varying the relative size and shape of the openings at the throat portions adjacent the transducer, the openings at the mouth portions opposite the transducer, and the surface areas of the sidewalls between the openings at the throat portions and the openings at the mouth portions, as well as the controlling the shape, dimensions, and location of the divider, etc.

Although several examples described herein refer to playing back left or right channel audio content via the side-firing transducers, in operation the side-firing transducers can also be used to play back at least some center channel content, and additionally the forward-firing transducers can be used to play back at least a portion of left or right channel audio content.

Figure 5:
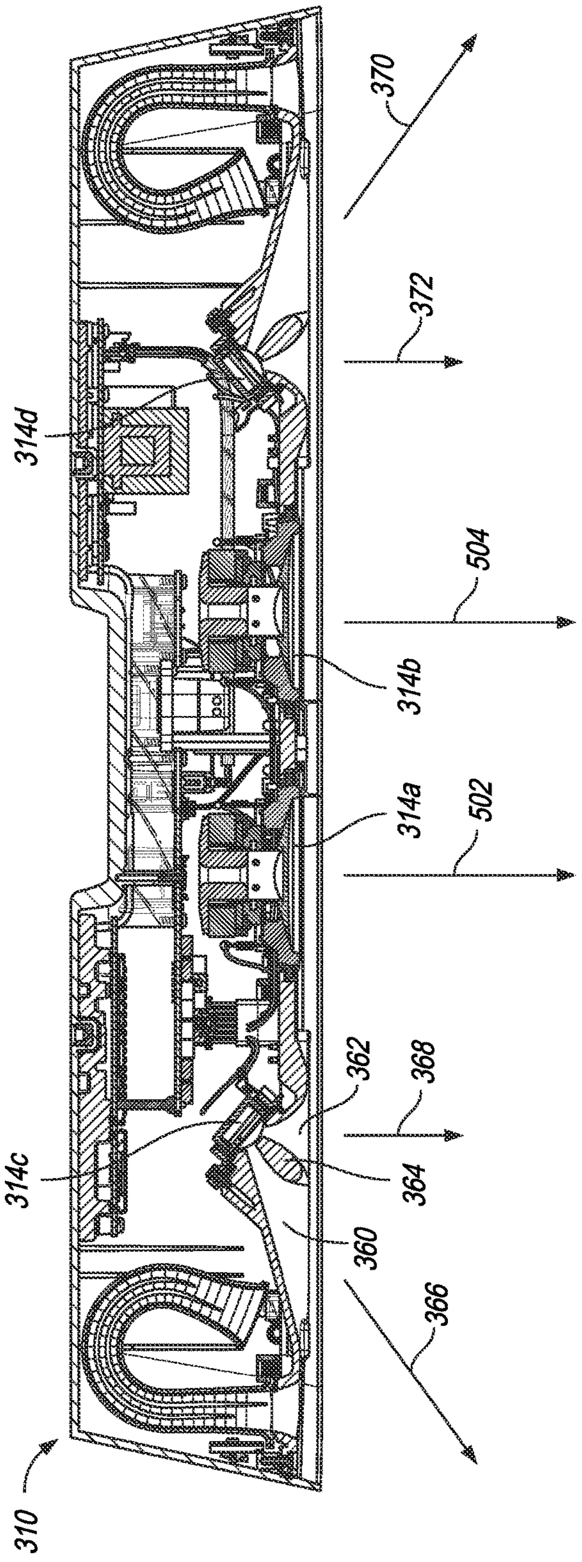
FIGS. 5 and 6 are top sectional views of a playback device during playback of various audio content in accordance with examples of the disclosed technology.

FIG. 5 is a top sectional view of a playback device 310 while playing back center channel audio content. The forward-firing transducers 314*a* and 314*b* can assume primary playback responsibility for this content, and can primarily direct such content along directions 502 504 which can be substantially parallel to the forward axis of the playback device 310. Audio played back via the left and right side-firing transducers 314*c* and 314*d* (e.g., along directions 366, 368, 370, and 372, as described above) can be used to fill a high-frequency portion of the center channel content, as in many instances the side-firing transducers 314*c* and 314*d* can be tweeters or other such transducers most suited for outputting high-frequency content, and the forward-firing transducers 314*a* and 314*b* can be woofers or other such transducers most suited for outputting low- and mid-frequency content. In some examples, the side-firing transducers 314*c* and 314*d* can play back center channel audio content above a crossover frequency (e.g., about 5 kilohertz).

Figure 6:
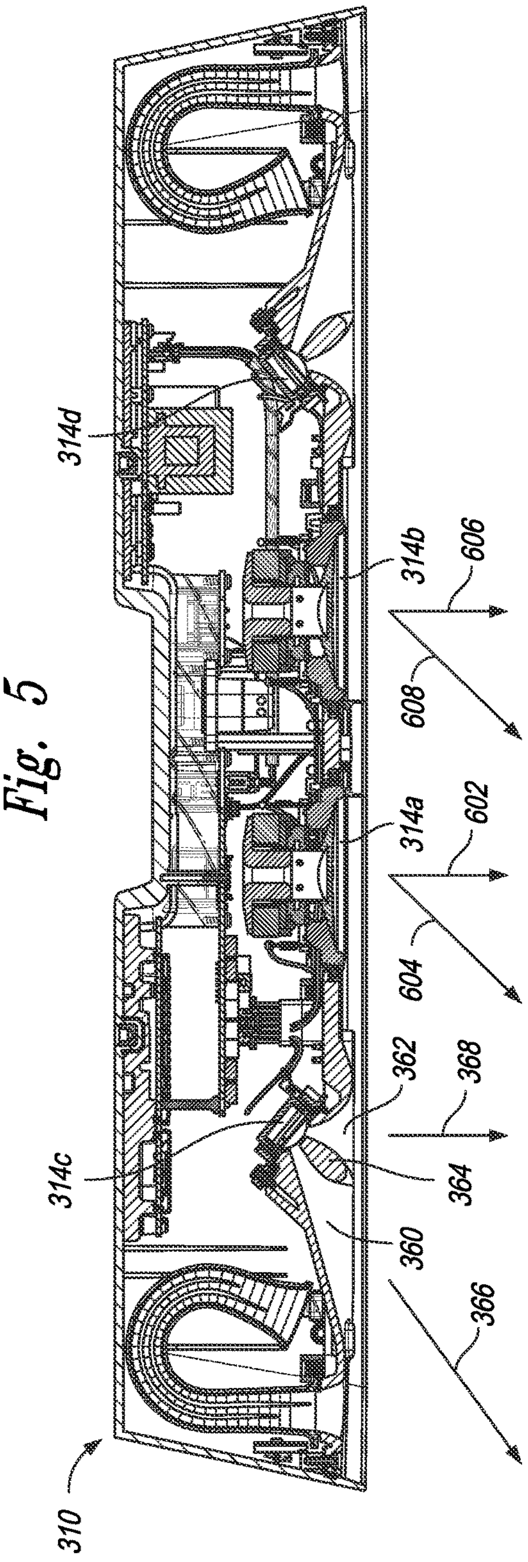

FIG. 6 is a top sectional view of a playback device 310 while playing back left channel audio content. Although only left channel audio playback is illustrated, a similar or identical approach can be taken to playing back right channel audio content via the corresponding right side-firing transducer 314*d*. As shown in FIG. 6, the left side-firing transducer 314*c* can assume primary playback responsibility for left channel audio content, and can primarily direct such content along directions 366 and 368. As noted previously, the forward-propagating direction 368 can be substantially parallel to the forward axis of the playback device 310, and the side-propagating direction 366 can be laterally angled with respect to the forward axis of the playback device 310. Audio played back via the forward-firing transducers 314*a* and 314*b* can used to fill a low-frequency portion of the left channel audio content, and beamsteering and/or arraying techniques can be used to provide some lateral directivity of the output of the forward-firing transducers 314*a* and 314*b*, illustrated as audio output along directions 602, 604, 606, and 608. In some examples, the forward-firing transducers 314*a* and 314*b* can play back left channel audio content below a crossover frequency (e.g., about 2 kilohertz).

Figure 7A:
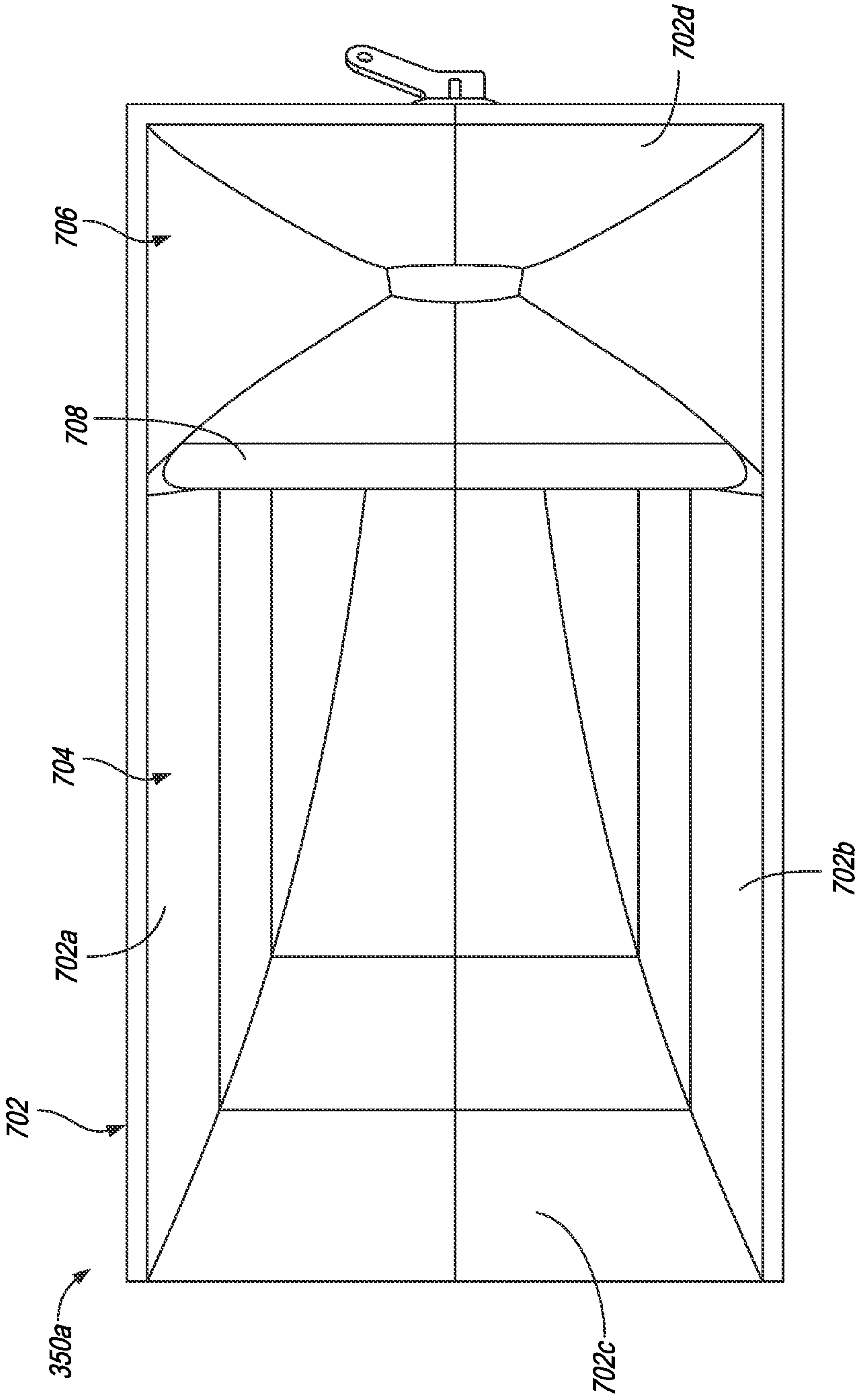
FIG. 7A is a front view of a waveguide in accordance with examples of the disclosed technology.
Figure 7B:
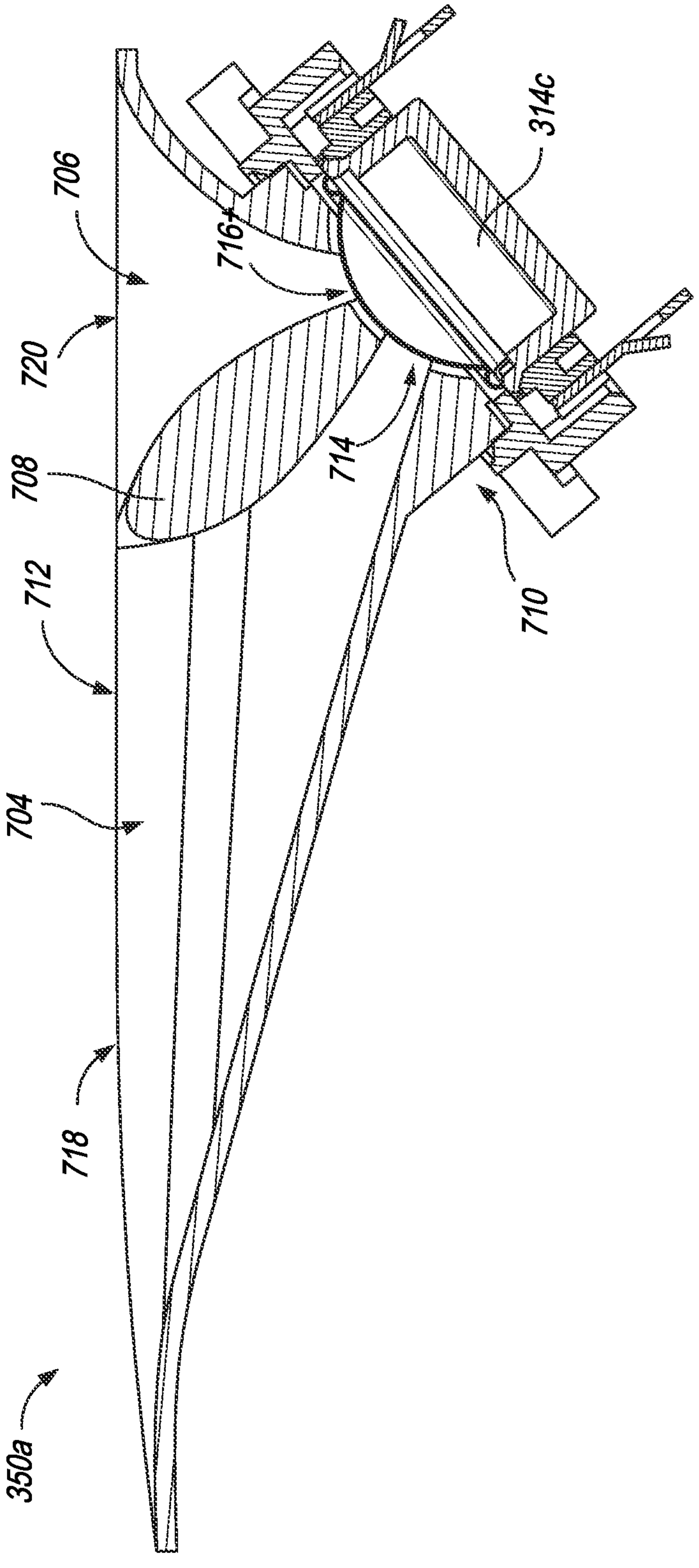
FIG. 7B is a top sectional view of the waveguide of FIG. 7A.
Figure 7C:
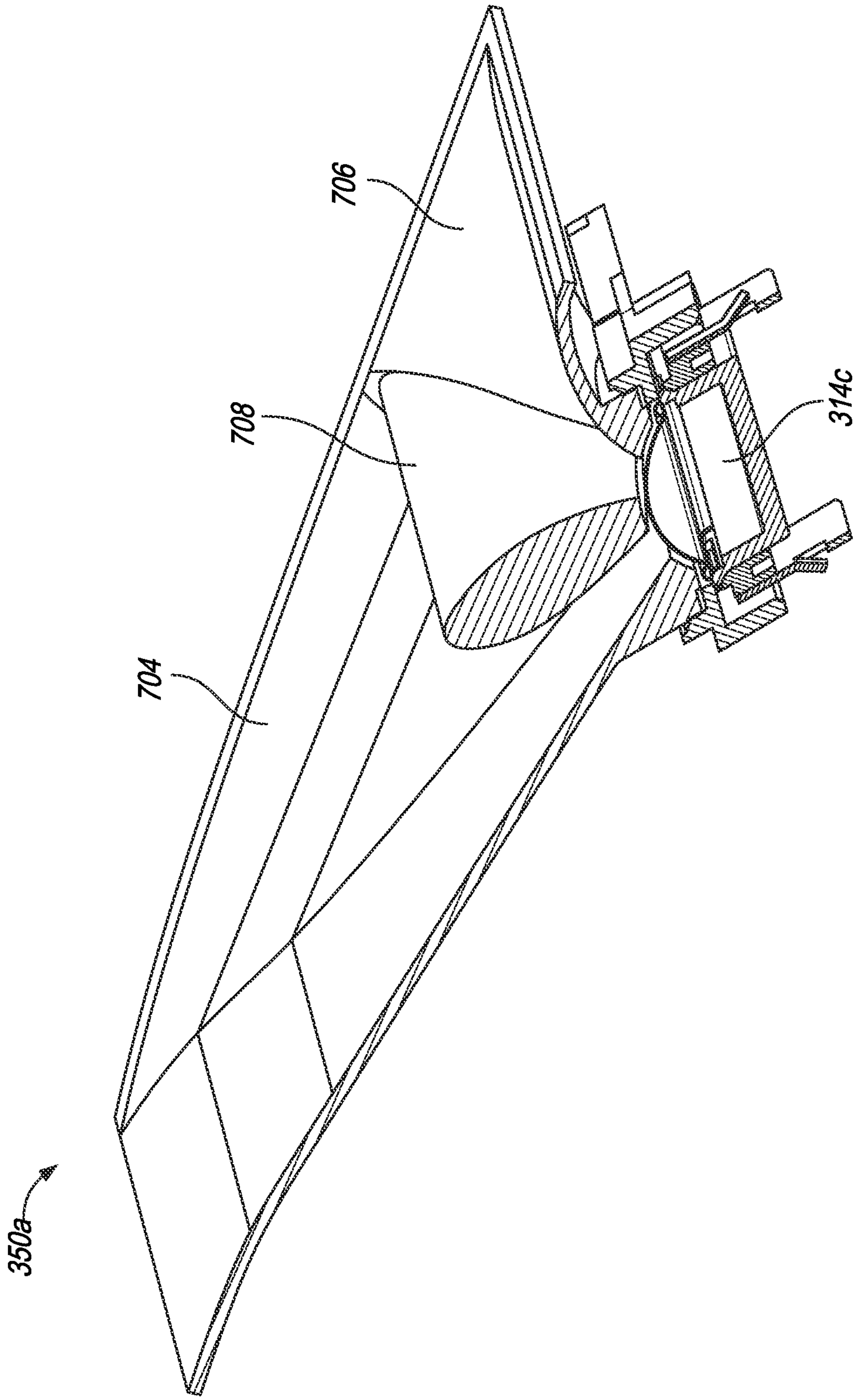
FIG. 7C is a perspective sectional view of the waveguide of FIG. 7A.

FIGS. 7A-7C illustrate front, top sectional, and perspective sectional views, respectively, of the first waveguide 350*a*. As noted elsewhere herein, the operation of a side-firing audio transducer can be markedly improved by use of a waveguide that directs acoustic energy along two discrete directions: a first side-propagating direction configured to reflect off a wall towards a listener, and a second forward-propagating direction configured to reach a listener without intervening reflection. With reference to FIG. 7A, such a waveguide 350*a* can include two chambers or cavities: a first cavity 704 directing sound generally along the forward-propagating axis and a second, larger cavity 706 directing sound along the side-propagating axis towards a reflective wall. This waveguide configuration can cause the side-propagating sound to reach a user (in a typical listening location in front of the soundbar) with a higher magnitude (e.g., 5 dB or more higher, 10 dB or more higher, etc.) than the forward-propagating sound. The resulting psychoacoustic effect of the side-directed sound reaching the listener with a higher magnitude than the forward-directed causes the user to perceive the sound as emanating from the side rather than in front of the user, although at a position that is in between the reflection point and the playback device.

As shown in FIG. 7A, the waveguide 350*a* has an outer body or shell 702 defining a first cavity 704 and a second cavity 706 separated by a divider 708. The shell 702 includes an upper wall 702*a*, a lower wall 702*b*, a left sidewall 702*c*, and a right sidewall 702*d*. The divider 708 extends vertically between the upper wall 702*a* and lower wall 702*b* of the outer shell 702, thereby defining and separating the first cavity 704 and the second cavity 706. The position and shape of the divider 708 determines in part the relative size of the first cavity 704 and the second cavity 706, which in turn determines their acoustic performance and resulting directivity. In various examples, each of the first cavity 704 and the second cavity 706 can have a generally horn shaped body.

As shown in FIGS. 7B and 7C, the divider 708 also extends between a first end portion 710 of the waveguide 350*a* that is disposed adjacent the transducer 314*c* and a second end portion 712 of the waveguide 350*a* disposed opposite the transducer 314*c*. At the first end portion 710, the divider 708 defines a first throat 714 of the first cavity 704 and a second throat 716 of the second cavity 706. The cross-sectional area of the first throat 714 can be larger than a cross-sectional area of the second throat 716, such that a greater proportion of acoustic energy emitted via the side-firing transducer 314*c* enters into the first cavity 704 than enters into the second cavity 706. In some examples, the cross-sectional area of the first throat 714 can be larger than the cross-sectional area of the second throat 716 by about 10%, 15%, 20%, 25%, 30%, 35%, 40%, 45%, 50%, 55%, 60% or more.

At the second end portion 712 of the waveguide 350*a*, the first cavity 704 has a first mouth 718 and the second cavity 706 has a second mouth 720. As illustrated, the first mouth 718 can be larger than the second mouth 720. Additionally, the surface area of the interior region of the first cavity 704 can be larger than the surface area of the interior region of the second cavity 706. Each of these discrepancies can contribute to a larger proportion of the acoustic energy emitted via the side-firing transducer 314*c* being directed along an axis defined by the first cavity 704 (e.g., along a side-propagating direction) than being directed along an axis defined by the second cavity 706 (e.g., along a forward-propagating direction).

The waveguide 350*a* illustrated in FIGS. 7A-7C includes a single divider 708 separating the waveguide 350*a* into two cavities 704 and 706. However, in some examples, additional dividers can be used, or other such configurations employed, to achieve three or more distinct cavities or chambers within the waveguide. Moreover, each of the resulting cavities or chambers can be configured to direct acoustic energy from the adjacent transducer along a different direction. In various examples, the waveguide can include three, four, five, six, or more distinct cavities or chambers, each configured to direct acoustic energy along a distinct direction.

Although the illustrated example includes a unitary outer shell 702 that is divided into a first cavity 704 and a second cavity 706, in various examples the two or more cavities can be formed as separate waveguide bodies that are disposed adjacent one another and/or coupled together adjacent the transducer.

c. Adjustable Waveguides

As discussed elsewhere herein, a multi-chamber waveguide can be used to direct acoustic energy from an audio transducer (e.g., a side-firing transducer) along one or more desired output directions. In some cases, it can be useful to dynamically vary the orientation of the output directions, and/or the relative amounts of acoustic energy directed along such directions, to achieve a desired acoustic effect. For example, depending on the playback device orientation (e.g., horizontal vs. vertical), the geometry of the room in which the playback device is positioned, the location of the user, the particular playback responsibilities assigned to the playback device, or other suitable parameter, the relative amounts of acoustic energy directed along each of the first cavity 704 and the second cavity 706 may be varied, and/or the general orientations of the first cavity 704 and/or the second cavity 706 can be varied.

In at least some examples, the divider 708 can be moveable, deformable, expandable/collapsible, or otherwise manipulable to vary the sizes of the first cavity 704 and/or the second cavity 706. For example, the divider 708 can be made of an inflatable material (e.g., an elastomeric balloon coupled to a fluid source) allowing the divider 708 to be inflated or deflated to achieve varying acoustic properties. In some examples, the divider 708 can be electronically and/or mechanically moveable, e.g., by pivoting about an axis or sliding over a predetermined range of motion to vary the relative dimensions of the first and second cavities 704 and 706. Additionally or alternatively, other aspects of the waveguide and/or playback device can be modified to achieve a desired acoustic directivity. For example, the orientation of the transducer itself can be modified (e.g., pivoting, rotating, or translating the transducer relative to the housing of the playback device), or other aspects of the waveguide can be modified besides the divider. For example, the entire waveguide can be rotated, pivoted, or translated, and/or outer wall portions of the waveguide can be moved or otherwise manipulated to achieve the desired acoustic directivity.

Figure 8A:
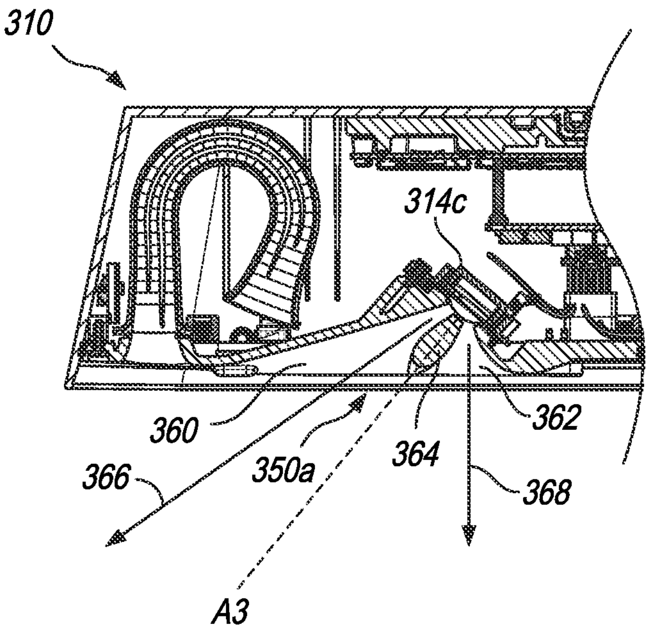
FIGS. 8A-8C illustrate a playback device having a variable waveguide in different configurations in accordance with examples of the disclosed technology.
Figure 8B:
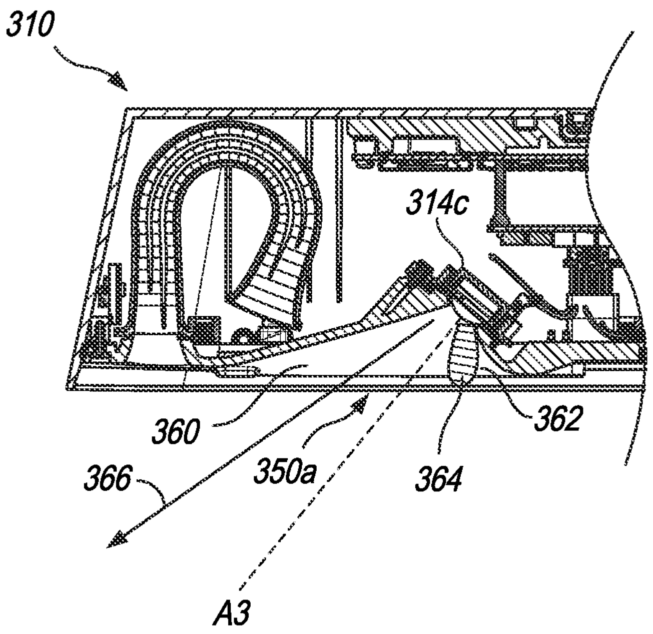
Figure 8C:
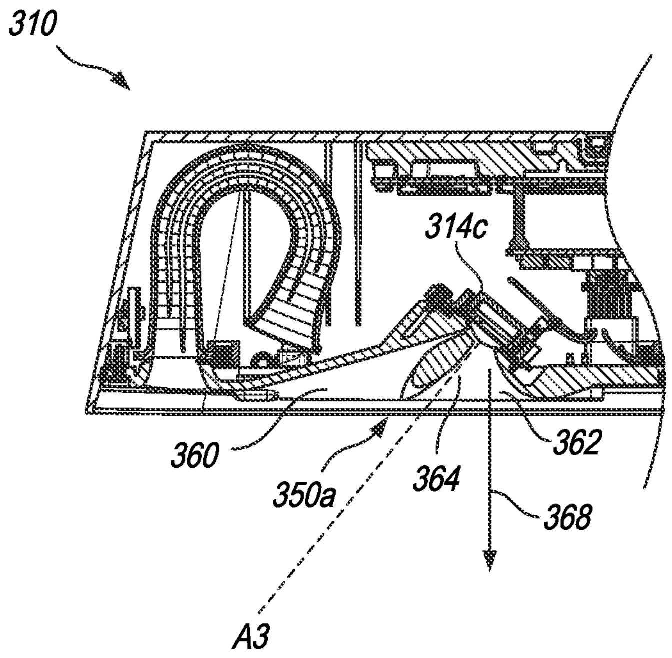

FIGS. 8A-8C illustrate examples of different configurations of the waveguide 350*a*. As shown in FIG. 8A, in a first configuration, the divider 364 separates the first chamber 360 and the second chamber 362. In operation, audio output by the side-firing transducer 314*c* (which is generally oriented along axis A3), is directed via the first chamber 360 along a first direction 366 and also directed via the second chamber 362 along a generally forward direction 368. By varying the configuration of the waveguide 350*a*, these directions and relative magnitudes of acoustic energy can be varied. In various examples, the configuration of the waveguide 350*a* can be varied by moving the divider 364, by changing a shape or size of the divider 364, by moving other portions of the waveguide 350*a* or by moving the entirety of the waveguide 350*a* relative to the transducer 314*c* and/or relative to housing of the playback device 310.

In FIG. 8B, the waveguide 350*a* assumes a second configuration. As illustrated, the divider 364 has moved relative to its position shown in FIG. 8A. As the divider 364 moves, the relative sizes of the first chamber 360 and the second chamber 362 vary, and accordingly the relative amounts of acoustic energy directed through each chamber will also vary. In the orientation shown in FIG. 8B, the divider 364 is positioned such that the first chamber 360 is enlarged relative to the configuration shown in FIG. 8A, while the second chamber 362 is reduced in size and is substantially closed (e.g., the second chamber 362 is no longer in fluid communication with the transducer 314*c*). In this configuration, a greater proportion (e.g., substantially all) of the acoustic energy emitted via the transducer 314*c* will be directed via the first chamber 360 along the side-propagating direction 366. Depending on the shape and configuration of the waveguide 350*a* and the divider 364, the side-propagating direction 366 of FIG. 8B can be shifted relative to the side-propagating direction 366 shown in FIG. 8A, for example being nearer to the axis A3 along which the transducer 314*c* is oriented. The configuration shown in FIG. 8B can be useful, for example, when using the playback device 310 in a vertical orientation, in which case the transducer 314*c* can serve as an up-firing transducer to play back vertical audio content to be directed towards a ceiling to reflect down towards a user.

In FIG. 8B, the waveguide 350*a* assumes a third configuration. As illustrated, the divider 364 has moved relative to its position shown in FIGS. 8A and 8B. In the orientation shown in FIG. 8C, the divider 364 is positioned such that the second chamber 362 is enlarged relative to the configuration shown in FIG. 8A, while the first chamber 360 is reduced in size and is substantially closed (e.g., the first chamber 360 is no longer in fluid communication with the transducer 314*c*). In this configuration, a greater proportion (e.g., substantially all) of the acoustic energy emitted via the transducer 314*c* will be directed via the second chamber 362 along the generally forward direction 368. Depending on the shape and configuration of the waveguide 350*a* and the divider 364, the generally forward direction 368 of FIG. 8B can be shifted relative to the forward direction 368 shown in FIG. 8A, for example being nearer to the axis A3 along which the transducer 314*c* is oriented. The configuration shown in FIG. 8C can be useful, for example, when using the playback device 310 to play back only center channel content (e.g., when grouped with discrete satellite layback devices which handle playback responsibilities for left and right channels). In such cases, it may be desirable to direct all audio output along a generally forward direction, and to reduce or minimize the amount of audio content directed along side-propagating directions.

In the illustrated examples of FIGS. 8B and 8C, the divider 364 is positioned so as to substantially close one of the chambers 360, 362. However, in various examples the divider can be disposed at any intermediate position or orientation, and need not completely or substantially close either of the chambers 360, 362. Additionally, several examples disclosed herein relate to playback devices having two opposed side-firing transducers, each with a waveguide coupled thereto. In these and other scenarios, each waveguide can be modified independently to achieve a desired acoustic output. For example, a left waveguide can be provided in a configuration that directs substantially all audio output along the generally forward-propagating direction, while a right waveguide can be provided in a configuration that directs substantially all audio output along the generally side-propagating direction. Alternatively, the waveguides can be configured to be controlled synchronously, such that any adjustment to one waveguide coincides with a corresponding adjustment to the other waveguide.

In some instances, movement of the divider 708 (or other such modification of the waveguide to achieve a desired directivity) can be performed automatically in response to one or more input parameters. Examples of such input parameters include acoustic properties of the environment (e.g., as detected via one or more microphones coupled to the playback device or another network microphone device in the environment), user selection or accelerometer data indicating an orientation in which the playback device has been positioned (e.g., a vertically oriented soundbar may utilize different waveguide configurations than a horizontally oriented soundbar), playback configuration (e.g., grouped or bonded with other playback devices), or any other suitable input.

In some examples, the one or more input parameters include location data regarding user location detected by the playback device, another device, or a combination thereof. The location data can include ultrasound, image data, microphone data, received signal strength indicator (RSSI) data and/or another suitable location measurement technique. For instance, in some examples, the playback device determines that a user has moved from a first location to a second location in a room. In response to this determination, the divider 708 of each waveguide can move accordingly to provide an enhanced psychoacoustic experience to the user at the second location. In some examples, a first divider of a first waveguide (e.g., the waveguide 350*a* of FIG. 3C) can move from a first orientation to a second orientation, and a second divider of a second waveguide (e.g., the waveguide 350*b* of FIG. 3C) can move from a third orientation to a fourth orientation. The second orientation and fourth orientation can be calculated by the playback device (or another device such as a cloud server). In some examples, the second and fourth orientation are different. In this way, the playback device has a variable directivity and can provide an enhanced psychoacoustic experience as the user moves throughout a listening environment.

Figure 9:
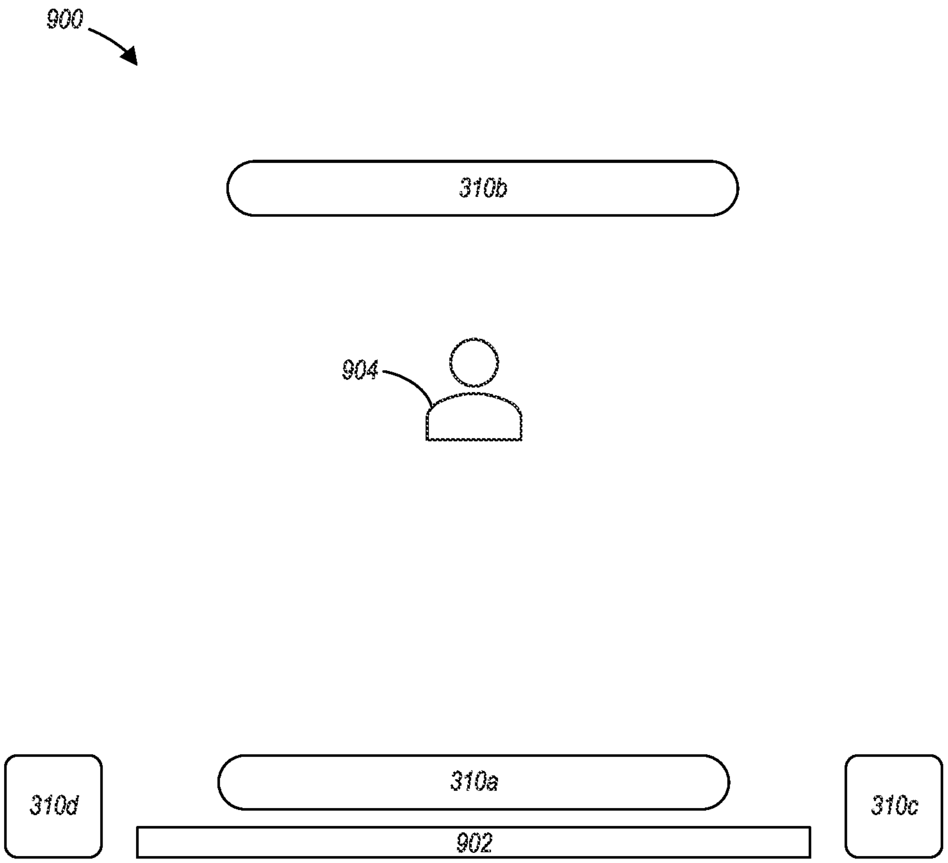
FIG. 9 illustrates an environment including a plurality of playback device configured in accordance with examples of the disclosed technology.

FIG. 9 illustrates an example environment 900 including a plurality of playback devices 310*a-d* disposed about a display device 902 and surrounding a user 904 positioned at an intended listening location. In this example, the playback devices 310*a-d* are arranged as part of a home theatre system, and are operably coupled to the display device 902 (e.g., a television). In the illustrated example, the playback device 310*a* is disposed horizontally and positioned in front of the user 904, for example being placed below and/or in front of the display device 902. Playback device 310*b* is also disposed horizontally but positioned behind the user 904, while playback devices 310*c* and 310*d* are disposed vertically on left and right sides of the display device 902 (e.g., mounted to a wall adjacent a television in a vertical orientation). These particular arrangements are exemplary only, and one of skill in the art will appreciate that one or more playback devices 310 can be arranged in any suitable orientation and in combination with any other number of playback devices 310 or other types or playback devices (e.g., subwoofers, portable playback devices, etc.).

In some examples, a playback device such as a soundbar may be operated in a plurality of modes, each of which calls for a different configuration of the waveguides associated with the side-firing transducers. In a first mode, the playback device (e.g., playback device 310*a* of FIG. 9) may be positioned horizontally and assigned playback responsibilities for left, right, and center channels. In such cases, the waveguides associated with the side-firing transducers can be configured as described previously. In a second mode, the playback device (e.g., playback device 310*b* of FIG. 9) may be positioned horizontally but assigned playback responsibilities for rear left (left surround) and rear right (right surround) channels. In such a mode, the divider may be manipulated so as to more effectively direct audio along desirable axes and achieve the appropriate psychoacoustic effects.

In a third mode (e.g., playback device 310*c* of FIG. 9) and a fourth mode (e.g., playback device 310*d* of FIG. 9), a pair of such playback devices may be oriented vertically and positioned, for instance, to the left and right of a television, respectively, such that playback device 310*c* operating in the third mode is assigned playback responsibilities for left channel only, and the other playback device 310*d* operating in the fourth mode is assigned playback responsibilities for right channel only. In such a mode, it may be advantageous to disable the downwardly facing transducer (e.g., the side-firing transducer that faces toward the ground while the soundbar is in the vertical orientation) and/or to manipulate the divider so as to direct more acoustic energy along the forward direction and less acoustic energy along the side-propagating (now down-propagating) direction. In some examples, the divider in the waveguide adjacent the downwardly facing transducer is adjusted such that a substantial portion of the audio output via the transducer is directed forward toward the user while the divider in the waveguide adjacent the upwardly facing transducer is adjusted such that a substantial portion of the audio output via the transducer is directed upward toward the ceiling.

In a fifth mode, a playback device (e.g., playback device 310*a* of FIG. 9) is positioned horizontally between two other devices operating in the third and fourth modes such that the playback device 310*a* operating in the fifth mode is assigned playback responsibilities for a center channel while the other devices 310*c* and 310*d* operating in the third and fourth modes are assigned left and right playback responsibilities, respectively. In some examples, in the fifth mode, the playback device 310*a* may reduce or turn off completely audio output via the first and second side-firing transducers (e.g., the transducers 314*c* and 314*d* of FIG. 3B) compared to when operating in the first mode. In some examples, in the fifth mode, a divider (e.g., the divider 364 of FIG. 3C) is adjusted such that most or substantially all of the audio content is directed forward with respect to the playback device 310*a* in a direction substantially aligned with the directions 368 and/or 370 of FIG. 3C.

In a sixth mode, the playback device (e.g., playback device 310*a* of FIG. 9) is positioned horizontally between two other playback devices (e.g., playback devices 310*c* and 310*d* of FIG. 9), as in the fifth mode, but also playback responsibilities for one or more additional channels. For instance, the playback device 310*a* in the sixth mode may be assigned center channel and left and round surround responsibilities. In some examples, in the sixth mode, one or more forward firing transducers (e.g., the transducer 314*a* and/or 314*b* of FIG. 3B) output center channel audio and a divider (e.g., the divider 364 of FIG. 3C) is adjusted such that most or substantially all of the left and right surround audio content is directed sideward with respect to the playback device 310*a* in directions substantially aligned with the directions 366 and 372, respectively, of FIG. 3C.

In some examples, the playback device is configured to dynamically adjust the mode in which it operates based one or more input parameters. For instance, the playback device may determine that one or more input parameters received via one or more sensors and/or user input received via a controller (e.g., the control device 130*a* of FIG. 1H) indicates that the playback device has transitioned from a vertical orientation to a horizontal orientation. Accordingly, based on the determination of the input parameter, the playback device an automatically switch or transition from operating in third mode (e.g., in a vertical orientation) to the first mode or the second mode (e.g., in a horizontal orientation). In some examples, the one or more determined input parameters further indicate whether the device is positioned adjacent (e.g., within about 1 meter) of a television or away from (e.g., more than about 1 meter) a television and correspondingly automatically operate in the first mode or second mode. In some examples, an input parameter comprises an indication that another playback device has joined or left a bonded zone or group. For example, based on a determination of the input parameter, the playback device may transition from operating in the sixth mode to operating in the fifth mode in response to a determination that one or more rear satellites devices have joined a bonded zone. Conversely, the playback device may transition from operating in the fifth mode to operating in the sixth mode or first mode in response to a determination one or more playback devices have left a bonded zone.

Figure 10:
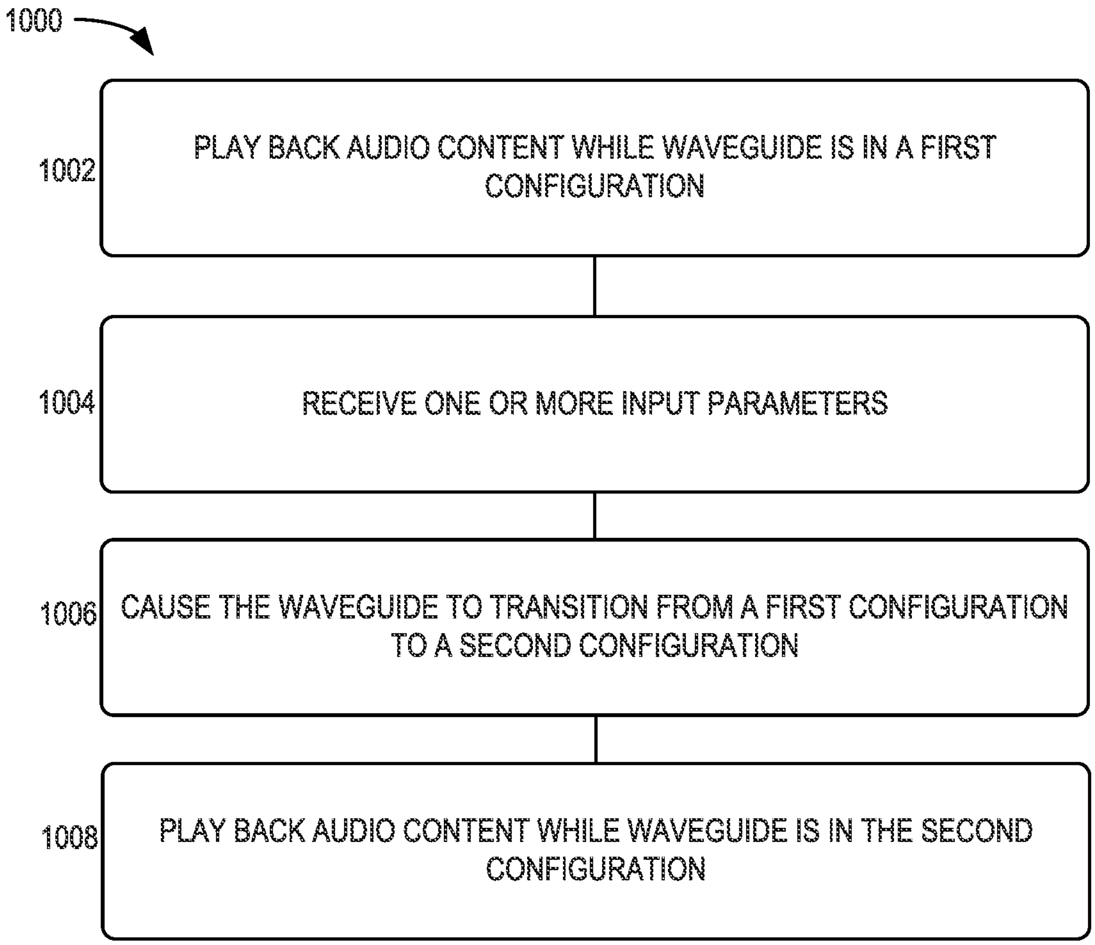
FIG. 10 illustrates an example method for playing back audio with a variable waveguide in accordance with the disclosed technology.

FIG. 10 illustrates a method 1000 for using an adjustable waveguide to modulate directivity of audio playback. The method may be performed by any suitable device such as the playback device 310 described elsewhere herein. In various examples, the illustrated blocks may be modified, combined, sub-divided, or performed in orders other than those shown and described herein.

The example method 1000 begins in block 1002 with playing back audio content (e.g., via playback device 310 of FIG. 3C) while an acoustic waveguide (e.g., the waveguide 350*a* of FIG. 3C) is in a first configuration. As discussed elsewhere herein, in some examples the waveguide 350*a* can be adjustable to achieve different acoustic directivity profiles, such as increasing or decreasing relative amounts of acoustic energy directed along a generally forward-propagating direction (e.g., direction 368 of FIG. 3C) and acoustic energy directed along a generally side-propagating direction (e.g., direction 366 of FIG. 3C). This adjustment can take a number of different forms, such as moving the divider 364 (FIG. 3C), changing the shape of the divider 364, or moving or changing the shape of other portions of the waveguide 350*a* (FIG. 3C.)

At block 1004, one or more input parameters are received. The parameters can be received at the playback device itself. Additionally or alternatively, one or more input parameters can be received at other devices, whether other local devices (e.g., other playback devices within the local environment and communicatively coupled over a local area network or wired connection) or remote computing devices (e.g., one or more computing devices communicatively coupled to the playback device over a wide area network). In various examples, the input parameter(s) can include one or more of: an indication of an orientation of the playback device (e.g., accelerometer data indicating vertical, horizontal, or other orientation), acoustic environment information (e.g., as determined using one or more microphones of the playback device or another network microphone device), user location information, microphone input data, an indication of playback responsibilities assigned to the playback device, an indication of which additional playback devices are grouped together for synchronous playback, a particular type of audio content being selected for playback (e.g., home theatre audio vs. music audio), or any other suitable input parameter.

After receiving the input parameter(s), in block 1006 the method 1000 includes causing the waveguide to transition from the first configuration to the second configuration. Finally, in block 1008, the method 1000 involves playing back audio content while the waveguide is in the second configuration. As discussed above with respect to FIGS. 8A-8C, the configuration of the waveguide (e.g., movement or manipulation of the divider 364 or other suitable adjustments) can affect the directivity of the acoustic output. In particular, the relative amounts of acoustic energy directed along a forward-propagating direction and along a generally side-propagating direction can be varied. Moreover, in some instances, the axes along which acoustic energy is directed from the waveguide can be varied. For example, in the second configuration, the waveguide's shape or orientation can be modified such that the side-propagating axis is further angled with respect to the forward axis than when the waveguide is in the first configuration. In this way, the playback device can have variable directivity and can provide an enhanced psychoacoustic experience as conditions change (e.g., as playback device is moved to a different orientation, a user moves throughout the listening environment, etc.).

IV. Conclusion

The above discussions relating to playback devices, controller devices, playback zone configurations, and media content sources provide only some examples of operating environments within which functions and methods described below may be implemented. Other operating environments and/or configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software examples or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "example" means that a particular feature, structure, or characteristic described in connection with the example can be included in at least one example of an invention. The appearances of this phrase in various places in the specification are not necessarily all referring to the same example, nor are separate or alternative examples mutually exclusive of other examples. As such, the examples described herein, explicitly and implicitly understood by one skilled in the art, can be combined with other examples.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to convey the substance of their work most effectively to others skilled in the art. Numerous specific details are set forth to provide a thorough understanding of the present disclosure. However, it is understood to those skilled in the art that certain examples of the present disclosure can be practiced without certain, specific details. In other instances, well known methods, procedures, components, and circuitry have not been described in detail to avoid unnecessarily obscuring examples of the examples. Accordingly, the scope of the present disclosure is defined by the appended claims rather than the foregoing description of examples.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The disclosed technology is illustrated, for example, according to various examples described below. Various examples of examples of the disclosed technology are described as numbered examples (1, 2, 3, etc.) for convenience. These are provided as examples and do not limit the disclosed technology. It is noted that any of the dependent examples may be combined in any combination, and placed into a respective independent example. The other examples can be presented in a similar manner.

Example 1. A playback device comprising: an enclosure having a front face substantially normal to a first direction; a side-firing audio transducer facing a second direction that is angled with respect to the first direction; a waveguide in fluid communication with the side-firing transducer, the waveguide comprising: a first chamber having a first throat portion proximate the side-firing transducer and a first mouth portion opposite the first throat portion, the first chamber extending from the first throat portion to the first mouth portion along a first central axis; and a second chamber having a second throat portion proximate the side-firing transducer and a second mouth portion opposite the second throat portion, the second chamber extending from the second throat portion to the second mouth portion along a second central axis, the first and second central axes diverging along the second direction away from the side-firing transducer.

Example 2. The playback device of any one of the preceding Examples, wherein the first central axis is more aligned with the first direction than the second direction.

Example 3. The playback device of any one of the preceding Examples, wherein the second direction is oriented between the first central axis and the second central axis.

Example 4. The playback device of any one of the preceding Examples, wherein the first chamber is configured to direct sound from the side-firing audio transducer along a forward direction, and wherein the second chamber is configured to direct sound from the side-firing audio transducer along a side direction, wherein an angle between the forward direction and the side direction is greater than about 45 degrees.

Example 5. The playback device of any one of the preceding Examples, wherein the waveguide is configured such that, when the side-firing audio transducer plays back audio that includes sound having a frequency of about 4 kilohertz, a sound pressure level (SPL) of audio directed along the side direction and measured at a listener location is greater than an SPL of audio directed along the forward direction and measured at the listener location by about 5 dB or more.

Example 6. The playback device of any one of the preceding Examples, wherein: the first chamber is configured to direct sound from the side-firing audio transducer along a forward direction; the second chamber is configured to direct sound from the side-firing audio transducer along a side direction; the first mouth portion has a first opening; the second mouth portion has a second opening; and the second opening has a surface area greater than the first opening.

Example 7. The playback device of any one of the preceding Examples, wherein: the first chamber is configured to direct sound from the side-firing audio transducer along a forward direction; the second chamber is configured to direct sound from the side-firing audio transducer along a side direction; the first chamber has a first interior surface area; and the second chamber has a second interior surface area that is greater than the first interior surface area.

Example 8. The playback device of any one of the preceding Examples, wherein: the first chamber is configured to direct sound from the side-firing audio transducer along a forward direction; the second chamber is configured to direct sound from the side-firing audio transducer along a side direction; the first chamber has a first length; and the second chamber has a second length that is greater than the first length.

Example 9. The playback device of any one of the preceding Examples, wherein the first and second mouth portions are substantially aligned with the front face of the enclosure.

Example 10. A playback device comprising: an enclosure having a front face substantially normal to a first axis; a side-firing audio transducer oriented along a second axis that is horizontally angled with respect to the first axis; a first waveguide body in fluid communication with the side-firing transducer, the first waveguide body configured to direct sound along a third axis; and a second waveguide body in fluid communication with the side-firing transducer, the second waveguide body configured to direct sound along a fourth axis, wherein the second axis lies between the third axis and the fourth axis.

Example 11. The playback device of any one of the preceding Examples, wherein the third axis is more aligned with the first axis than the second axis.

Example 12. The playback device of any one of the preceding Examples, wherein, during playback of audio via the side-firing transducer of audio that includes sound having a frequency of about 4 kilohertz, a ratio of acoustic energy along the fourth axis to the acoustic energy along the third axis is about 5 dB or more.

Example 13. The playback device of any one of the preceding Examples, wherein the first waveguide and the second waveguide are separated by a divider, and wherein the divider is moveable to alter relative dimensions of the first waveguide body and the second waveguide body.

Example 14. The playback device of any one of the preceding Examples, wherein: the first waveguide body is configured to direct sound from the side-firing audio transducer along a forward direction; the second waveguide body is configured to direct sound from the side-firing audio transducer along a side direction; the first waveguide body has a first opening adjacent the side-firing transducer; and the second waveguide body has a second opening adjacent the side-firing transducer, the second opening having a larger cross-sectional dimension than the first opening.

Example 15. The playback device of any one of the preceding Examples, wherein: the first waveguide body is configured to direct sound from the side-firing audio transducer along a forward direction; the second waveguide body is configured to direct sound from the side-firing audio transducer along a side direction; the first waveguide body has a first interior surface area; and the second waveguide body has a second interior surface area that is greater than the first interior surface area.

Example 16. The playback device of any one of the preceding Examples, wherein the first axis and the fourth axis are separated from one another by greater than about 45 degrees.

Example 17. A playback device comprising: an audio transducer; and a waveguide coupled to the transducer, the waveguide comprising: a body comprising a first end portion having a first opening configured to be disposed proximate the audio transducer and a second end portion having a second opening opposite the first end portion, the body defining an interior region between the first opening and the second opening; and a divider within the interior region defining a first chamber and a second chamber, each of the first chamber and the second chamber being in fluid communication with the first opening and the second opening, the first chamber configured to direct a first set of sound waves from the transducer along a forward sound axis and the second chamber configured to direct a second set of sound waves from the transducer along a side sound axis.

Example 18. The playback device of any one of the preceding Examples, wherein, when the transducer plays back audio at a frequency of about 4 kHz, a sound pressure level (SPL) of sound directed along the side sound axis and measured at a listener location is greater than an SPL of sound directed along the forward sound axis and measured at the listener location by about 5 dB or more.

Example 19. The playback device of any one of the preceding Examples, wherein forward sound axis and the side sound axis are separated from one another by greater than about 45 degrees.

Example 20. The playback device of any one of the preceding Examples, wherein: the first chamber defines a third opening adjacent the transducer; and the second chamber defines a fourth opening adjacent the transducer, the fourth opening having a larger cross-sectional dimension than the third opening.

Example 21. The playback device of any one of the preceding Examples, wherein: the first chamber has a first interior surface area; and the second chamber has a second interior surface area that is greater than the first interior surface area.

Example 22. The playback device of any one of the preceding Examples, wherein the divider extends between the first opening and the second opening.

Example 23. The playback device of any one of the preceding Examples, wherein the divider is moveable between a first orientation and a second orientation.

Example 24. A playback device comprising: an enclosure having a front face substantially normal to a first direction; a side-firing audio transducer facing a second direction that is angled with respect to the first direction; a waveguide in fluid communication with the side-firing transducer, the waveguide comprising a divider separating first and second chambers, the divider being adjustable between different orientations; one or more processors; and one or more tangible, non-transitory media storing instructions that, when executed by the one or more processors, cause the playback device to perform operations comprising: playing back audio content while the divider is in a first orientation; causing the divider to move from a first orientation to a second orientation; and playing back audio content while the divider is in the second orientation.

Example 25. The playback device of any one of the preceding Examples, wherein the operations further comprise receiving an input parameter and, after receiving the input parameter, causing the divider to move from a first orientation to a second orientation.

Example 26. The playback device of any one of the preceding Examples, wherein the input parameter comprises one or more of: an indication of an orientation of the playback device (e.g., accelerometer data indicating vertical or horizontal orientation); acoustic environment information; user location information; microphone input data; an indication of playback responsibilities assigned to the playback device; or an indication of a change in additional playback devices grouped with the playback device for synchronous playback.

Example 27. The playback device of any one of the preceding Examples, wherein, in the second orientation, the divider has a different shape than in the first orientation.

Example 28. The playback device of any one of the preceding Examples, wherein, in the first orientation, the divider causes a first proportion of acoustic energy emitted by the transducer to be passed along the first chamber relative to the second chamber, and wherein in the second orientation, the divider causes a second proportion of acoustic energy emitted by the transducer to be passed along the first chamber relative to the second chamber, the first proportion being different than the second proportion.

Example 29. The playback device of any one of the preceding Examples, wherein, the first chamber is generally forward-directed and the second chamber is generally side-directed, and while the divider is in the first orientation, a greater proportion of the acoustic energy is directed along a side-directed axis than while the divider is in the second orientation.

Example 30. The playback device of any one of the preceding Examples, wherein, in the first orientation, both the first chamber and the second chamber are open, and wherein, in the second orientation, the second chamber is substantially closed.

Example 31. A method comprising playing back, via an audio playback device having a side-firing audio transducer and a waveguide in fluid communication with the side-firing audio transducer, audio content while a divider of the waveguide is in a first orientation, the divider separating first and second chambers of the waveguide; causing the divider to move from a first orientation to a second orientation; and playing back, via the audio playback device, audio content while the divider is in the second orientation.

Example 32. The method of any one of the preceding Examples, further comprising receiving an input parameter and, after receiving the input parameter, causing the divider to move from a first orientation to a second orientation.

Example 33. The method of any one of the preceding Examples, wherein the input parameter comprises one or more of: an indication of an orientation of the playback device (e.g., accelerometer data indicating vertical or horizontal orientation); acoustic environment information; user location information; microphone input data; an indication of playback responsibilities assigned to the playback device; or an indication of a change in additional playback devices grouped with the playback device for synchronous playback.

Example 34. The method of any one of the preceding Examples, wherein, in the second orientation, the divider has a different shape than in the first orientation.

Example 35. The method of any one of the preceding Examples, wherein, in the first orientation, the divider causes a first proportion of acoustic energy emitted by the transducer to be passed along the first chamber relative to the second chamber, and wherein in the second orientation, the divider causes a second proportion of acoustic energy emitted by the transducer to be passed along the first chamber relative to the second chamber, the first proportion being different than the second proportion.

Example 36. The method of any one of the preceding Examples, wherein, the first chamber is generally forward-directed and the second chamber is generally side-directed, and while the divider is in the first orientation, a greater proportion of the acoustic energy is directed along a side-directed axis than while the divider is in the second orientation.

Example 37. The method of any one of the preceding Examples, wherein, in the first orientation, both the first chamber and the second chamber are open, and wherein, in the second orientation, the second chamber is substantially closed.

Example 38. A playback device comprising: an enclosure having a front face substantially normal to a first direction; a side-firing audio transducer facing a second direction that is angled with respect to the first direction; a waveguide in fluid communication with the side-firing transducer, the waveguide comprising a divider separating first and second chambers, the divider being adjustable between different orientations; one or more processors; and one or more tangible, non-transitory, computer-readable media storing instructions that, when executed by the one or more processors, cause the playback device to perform operations comprising: while in a first operating mode, playing back right, left, and center channel content while the divider is in a first orientation; while in a second operating mode, playing back only left channel content while the divider is in a second orientation different from the first orientation; and while in a third operating mode, playing back only right channel content while the divider is in a third orientation different from the first orientation.

Example 39. The playback device of any one of the preceding Examples, wherein, relative to the first orientation, the second orientation of the divider reduces an amount of acoustic energy directed along a side direction.

Example 40. The playback device of any one of the preceding Examples, wherein, relative to the first orientation, the third orientation of the divider reduces an amount of acoustic energy directed along a side direction.

Example 41. The playback device of any one of the preceding Examples, wherein the operations further comprise: while in a fourth operating mode, playing back rear surround and rear surround channel content while divider is in a fourth orientation different from the first, second, and third orientations.

Example 42. The playback device of any one of the preceding Examples, wherein, relative to the first orientation, the third orientation of the divider increases an amount of acoustic energy directed along a side direction.

Example 43. The playback device of any one of the preceding Examples, wherein the operations further comprise: while in a fifth operating mode, playing back only center channel content while the divider is in a fifth orientation different from the first, second, and third orientations.

Example 44. The playback device of any one of the preceding Examples, wherein, relative to the first orientation, the fifth orientation reduces an amount of acoustic energy directed along a side direction.

Example 45. The playback device of any one of the preceding Examples, wherein the operations further comprise: while in a sixth operating mode, playing back center, left surround, and right surround channel content while the divider is in a sixth orientation different from the first, second, and third orientations.

Example 46. The playback device of any one of the preceding Examples, wherein, relative to the first orientation, the sixth orientation increases an amount of acoustic energy directed along a side direction.

Example 47. The playback device of any one of the preceding Examples, wherein the operations further comprise: receiving an input parameter; and after receiving the input parameter, transitioning the playback device from one of the first, second, or third operating modes to another of the first, second, or third operating modes, relative to the first orientation, the sixth orientation increases an amount of acoustic energy directed along a side direction.

Example 48. The playback device of any one of the preceding Examples, wherein the input parameter comprises one or more of: an indication of an orientation of the playback device (e.g., accelerometer data indicating vertical or horizontal orientation); acoustic environment information; user location information; microphone input data; an indication of playback responsibilities assigned to the playback device; or an indication of a change in additional playback devices grouped with the playback device for synchronous playback.

Example 49. A method comprising: while in a first operating mode of a playback device having a side-firing audio transducer and a waveguide in fluid communication with the side-firing audio transducer, playing back right, left, and center channel content while a divider of the waveguide is in a first orientation, the divider separating first and second chambers of the waveguide; while in a second operating mode, playing back only left channel content while the divider is in a second orientation different from the first orientation; and while in a third operating mode, playing back only right channel content while the divider is in a third orientation different from the first orientation.

Example 50. The method of any one of the preceding Examples, wherein, relative to the first orientation, the second orientation of the divider reduces an amount of acoustic energy directed along a side direction.

Example 51. The method of any one of the preceding Examples, wherein, relative to the first orientation, the third orientation of the divider reduces an amount of acoustic energy directed along a side direction.

Example 52. The method of any one of the preceding Examples, further comprising: while in a fourth operating mode, playing back rear surround and rear surround channel content while divider is in a fourth orientation different from the first, second, and third orientations.

Example xx. The method of any one of the preceding Examples, wherein, relative to the first orientation, the fourth orientation of the divider increases an amount of acoustic energy directed along a side direction.

Example 53. The method of any one of the preceding Examples, further comprising: while in a fifth operating mode, playing back only center channel content while the divider is in a fifth orientation different from the first, second, and third orientations.

Example 54. The method of any one of the preceding Examples, wherein, relative to the first orientation, the fifth orientation reduces an amount of acoustic energy directed along a side direction.

Example 55. The method of any one of the preceding Examples, further comprising: while in a sixth operating mode, playing back center, left surround, and right surround channel content while the divider is in a sixth orientation different from the first, second, and third orientations.

Example 56. The method of any one of the preceding Examples, wherein, relative to the first orientation, the sixth orientation increases an amount of acoustic energy directed along a side direction.

Example 57. The method of any one of the preceding Examples, further comprising: receiving an input parameter; and after receiving the input parameter, transitioning the playback device from one of the first, second, or third operating modes to another of the first, second, or third operating modes, relative to the first orientation, the sixth orientation increases an amount of acoustic energy directed along a side direction.

Example 58. The method of any one of the preceding Examples, wherein the input parameter comprises one or more of: an indication of an orientation of the playback device (e.g., accelerometer data indicating vertical or horizontal orientation); acoustic environment information; user location information; microphone input data; an indication of playback responsibilities assigned to the playback device;

or an indication of a change in additional playback devices grouped with the playback device for synchronous playback.

Example 59. One or more tangible, non-transitory computer-readable media storing instructions that, when executed by one or more processors of a playback device, cause the playback device to perform a method comprising any one of the preceding Examples.

The invention claimed is:

1. A playback device comprising:
- an enclosure having a front face substantially normal to a first direction;
- a side-firing audio transducer facing a second direction that is angled with respect to the first direction;
- a waveguide in fluid communication with the side-firing transducer, the waveguide comprising:
  - a first chamber having a first throat portion proximate the side-firing transducer and a first mouth portion opposite the first throat portion, the first chamber extending from the first throat portion to the first mouth portion along a first central axis; and
  - a second chamber having a second throat portion proximate the side-firing transducer and a second mouth portion opposite the second throat portion, the second chamber extending from the second throat portion to the second mouth portion along a second central axis, the first and second central axes diverging along the second direction away from the side-firing transducer.

2. The playback device of claim 1, wherein the first central axis is more aligned with the first direction than the second direction.

3. The playback device of claim 1, wherein the second direction is oriented between the first central axis and the second central axis.

4. The playback device of claim 1, wherein the first chamber is configured to direct sound from the side-firing audio transducer along a forward direction, and wherein the second chamber is configured to direct sound from the side-firing audio transducer along a side direction, wherein an angle between the forward direction and the side direction is greater than about 45 degrees.

5. The playback device of claim 4, wherein the waveguide is configured such that, when the side-firing audio transducer plays back audio that includes sound having a frequency of about 4 kilohertz, a sound pressure level (SPL) of audio directed along the side direction and measured at a listener location is greater than an SPL of audio directed along the forward direction and measured at the listener location by about 5 dB or more.

6. The playback device of claim 1, wherein:
- the first chamber is configured to direct sound from the side-firing audio transducer along a forward direction;
- the second chamber is configured to direct sound from the side-firing audio transducer along a side direction;
- the first mouth portion has a first opening;
- the second mouth portion has a second opening; and
- the second opening has a surface area greater than the first opening.

7. The playback device of claim 1, wherein:
- the first chamber is configured to direct sound from the side-firing audio transducer along a forward direction;
- the second chamber is configured to direct sound from the side-firing audio transducer along a side direction;
- the first chamber has a first interior surface area; and
- the second chamber has a second interior surface area that is greater than the first interior surface area.

8. The playback device of claim 1, wherein:
- the first chamber is configured to direct sound from the side-firing audio transducer along a forward direction;
- the second chamber is configured to direct sound from the side-firing audio transducer along a side direction;
- the first chamber has a first length; and
- the second chamber has a second length that is greater than the first length.

9. A playback device comprising:
- an enclosure having a front face substantially normal to a first axis;
- a side-firing audio transducer oriented along a second axis that is horizontally angled with respect to the first axis;
- a first waveguide body in fluid communication with the side-firing transducer, the first waveguide body configured to direct sound along a third axis; and
- a second waveguide body in fluid communication with the side-firing transducer, the second waveguide body configured to direct sound along a fourth axis, wherein the second axis lies between the third axis and the fourth axis.

10. The playback device of claim 9, wherein the third axis is more aligned with the first axis than the second axis.

11. The playback device of claim 9, wherein, during playback of audio via the side-firing transducer of audio that includes sound having a frequency of about 4kilohertz, a ratio of acoustic energy along the fourth axis to the acoustic energy along the third axis is about 5 dB or more.

12. The playback device of claim 9, wherein the first waveguide and the second waveguide are separated by a divider, and wherein the divider is moveable to alter relative dimensions of the first waveguide body and the second waveguide body.

13. The playback device of claim 9, wherein:
- the first waveguide body is configured to direct sound from the side-firing audio transducer along a forward direction;
- the second waveguide body is configured to direct sound from the side-firing audio transducer along a side direction;
- the first waveguide body has a first opening adjacent the side-firing transducer; and
- the second waveguide body has a second opening adjacent the side-firing transducer, the second opening having a larger cross-sectional dimension than the first opening.

14. The playback device of claim 9, wherein:
- the first waveguide body is configured to direct sound from the side-firing audio transducer along a forward direction;
- the second waveguide body is configured to direct sound from the side-firing audio transducer along a side direction;
- the first waveguide body has a first interior surface area; and
- the second waveguide body has a second interior surface area that is greater than the first interior surface area.

15. A playback device comprising:
- an audio transducer; and
- a waveguide coupled to the transducer, the waveguide comprising:
  - a body comprising a first end portion having a first opening configured to be disposed proximate the audio transducer and a second end portion having a second opening opposite the first end portion, the body defining an interior region between the first opening and the second opening; and a divider within the interior region defining a first chamber and a second chamber, each of the first chamber and the second chamber being in fluid communication with the first opening and the second opening, the first chamber configured to direct a first set of sound waves from the transducer along a forward sound axis and the second chamber configured to direct a second set of sound waves from the transducer along a side sound axis, wherein the first chamber defines a third opening adjacent the transducer, and the second chamber defines a fourth opening adjacent the transducer, the fourth opening having a larger cross-sectional dimension than the third opening.

16. The playback device of claim 15, wherein, when the transducer plays back audio at a frequency of about 4 kHz, a sound pressure level (SPL) of sound directed along the side sound axis and measured at a listener location is greater than an SPL of sound directed along the forward sound axis and measured at the listener location by about 5 dB or more.

17. The playback device of claim 15, wherein:

the first chamber has a first interior surface area; and the second chamber has a second interior surface area that is greater than the first interior surface area.

18. The playback device of claim 15, wherein the divider extends between the first opening and the second opening.

19. The playback device of claim 15, wherein the divider is moveable between a first orientation and a second orientation.

* * * * *